United States Patent
Endo et al.

(10) Patent No.: US 11,294,108 B2
(45) Date of Patent: Apr. 5, 2022

(54) DISPLAY

(71) Applicant: TOPPAN PRINTING CO., LTD., Tokyo (JP)

(72) Inventors: Hiroyuki Endo, Tokyo (JP); Akira Nagano, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/867,377

(22) Filed: Jan. 10, 2018

(65) Prior Publication Data
US 2018/0128949 A1    May 10, 2018

Related U.S. Application Data

(63) Continuation of application No. PCT/CT2016/070849, filed on Jul. 14, 2016.

(30) Foreign Application Priority Data

Jul. 15, 2015 (JP) ............................ JP2015-0141190
Dec. 15, 2015 (JP) ............................ JP2015-0244599

(51) Int. Cl.
G02B 5/18 (2006.01)
G09F 19/14 (2006.01)
(Continued)

(52) U.S. Cl.
CPC .............. *G02B 5/18* (2013.01); *B42D 25/324* (2014.10); *B42D 25/328* (2014.10);
(Continued)

(58) Field of Classification Search
CPC .... B42D 25/29; B42D 25/324; B42D 25/328; G02B 5/18; G02B 5/1814; G02B 5/1861;
(Continued)

(56) References Cited

U.S. PATENT DOCUMENTS 7,102,823 B2 *  9/2006  Schilling ............... B42D 25/29
                                                    283/94
7,297,386 B2 * 11/2007  Suzuki .................... B29C 59/02
                                                    428/141
(Continued)

FOREIGN PATENT DOCUMENTS

EP    2 264 488 A1   12/2010
JP      4315334 B2    8/2009
(Continued)

OTHER PUBLICATIONS

International Preliminary Report on Patentability dated Jan. 16, 2018, in International Patent Application No. PCT/JP2016/070849, 8 pages.
Extended European Search Report dated Feb. 12, 2019, in European Patent Application No. 16824528.0, 8 pages.

*Primary Examiner* — Audrey Y Chang
(74) *Attorney, Agent, or Firm* — Squire Patton Boggs (US) LLP

(57) ABSTRACT

Each protrusion surface has a shape of a strip extending in an extension direction perpendicular to the arrangement direction. Each protrusion surface tapers toward a top section in a thickness direction of an uneven structure. Each depression surface has a shape of a strip extending in the extension direction. Each depression surface tapers toward a bottom section in the thickness direction of the uneven structure. The protrusion surfaces and the depression surfaces are arranged at a period that limits reflection of light that is incident on the uneven surface in a front-view direction of the uneven surface and diffracts the light incident on the uneven surface to emit diffracted light in an oblique view direction of the uneven surface. The uneven structure has a property of absorbing light incident on the uneven structure.

11 Claims, 16 Drawing Sheets

(51) Int. Cl.
  *G02B 5/02* (2006.01)
  *B42D 25/324* (2014.01)
  *B42D 25/328* (2014.01)
(52) U.S. Cl.
  CPC ......... *G02B 5/0221* (2013.01); *G02B 5/0257* (2013.01); *G02B 5/0263* (2013.01); *G02B 5/0284* (2013.01); *G02B 5/0294* (2013.01); *G02B 5/1819* (2013.01); *G02B 5/1842* (2013.01); *G02B 5/1861* (2013.01); *G09F 19/14* (2013.01)
(58) Field of Classification Search
  CPC .. G02B 5/1819; G02B 5/1842; G02B 5/0221; G02B 5/0263; G02B 5/0294; G02B 5/0257; G02B 5/0284; G09F 19/14
  USPC ..................... 359/2, 567, 572, 569
  See application file for complete search history.

(56) References Cited

U.S. PATENT DOCUMENTS

| | | | | |
|---|---|---|---|---|
| 7,719,733 | B2* | 5/2010 | Schilling | B42D 25/29 359/2 |
| 2010/0085642 | A1* | 4/2010 | Drinkwater | F21V 33/006 359/567 |
| 2012/0162771 | A1* | 6/2012 | Walter | B42D 25/29 359/569 |
| 2015/0192897 | A1* | 7/2015 | Schilling | B42D 25/355 359/2 |

FOREIGN PATENT DOCUMENTS

| | | |
|---|---|---|
| JP | 4420138 B2 | 2/2010 |
| JP | 2014-238465 A | 12/2014 |
| JP | 5740811 B2 | 7/2015 |

* cited by examiner

DISPLAY

BACKGROUND

The present disclosure relates to a display that can be used to prevent counterfeiting of an article.

Securities, such as gift certificates and checks, cards, such as credit cards, bank cards, and ID cards, and identification documents, such as passports and driver's licenses include displays that produce visual effects different from those presented by a printed object formed by ink to prevent counterfeiting of these articles.

Such a display may include a plurality of microstructures of protrusions and depressions, which are arranged in a first direction and a second direction, which is perpendicular to the first direction, at regular intervals that are less than or equal to the shortest wavelength of visible light. The microstructures prevent reflection of the light incident on the display, allowing the display to display a black color in the front-view direction of the display. In addition, the periodic microstructures display an iridescent color created by diffracted light in the oblique view direction of the display (see Japanese Patent No. 4420138 and Japanese Patent No. 4315334, for example).

The display of a black color in the front view of the display is possible even when the amount of light incident on the display is small. In contrast, the display of an iridescent color in the oblique view of the display is less likely to be perceived when the amount of light incident on the display is less. In the display described above, in order to further enhance the effect of preventing counterfeiting of articles, it is desirable that the display in the front-view clearly differ from the display in an oblique direction even when only a small amount of light is incident on the display. This requires a higher brightness of the diffracted light.

Further, since the microstructures are arranged at regular intervals in the first direction and the second direction, the microstructures are arranged substantially at regular intervals in other directions including directions at angles of about 27° and 45° to the first direction. As a result, the diffracted light emitted from the display is visually perceived in a large range of angles. In order to differentiate the display from a printed object formed by ink, for example, the display needs to have a higher directivity in the direction in which the diffracted light is emitted.

Such a demand applies not only to a display used to limit counterfeiting of articles but also to a display for decorating an article and a display that is observed for its own quality.

SUMMARY

It is an objective of the present disclosure to provide a display that increases the brightness of diffracted light while increasing the directivity in the direction in which the diffracted light is emitted.

To achieve the foregoing objective, a display is provided that includes an uneven structure having an uneven surface, which serves as an incident surface, on which light is incident. The uneven surface includes a section in which protrusion surfaces and depression surfaces alternate in an arrangement direction. Each protrusion surface has a shape of a strip extending in an extension direction perpendicular to the arrangement direction. Each protrusion surface tapers toward a top section in a thickness direction of the uneven structure. Each depression surface has a shape of a strip extending in the extension direction. Each depression surface tapers toward a bottom section in the thickness direction of the uneven structure. The protrusion surfaces and the depression surfaces are arranged at a period that limits reflection of light that is incident on the uneven surface in a front-view direction of the uneven surface and diffracts the light incident on the uneven surface to emit diffracted light in an oblique view direction of the uneven surface. The uneven structure has a property of absorbing light incident on the uneven structure.

In the display, the protrusion surfaces and the depression surfaces alternate in the arrangement direction and extend in the extension direction. This allows the uneven surface to emit diffracted light in the plane extending in the arrangement direction and the thickness direction of the uneven structure, increasing the directivity of the diffracted light in the emission direction. The protrusion surfaces in the uneven surface extend in the extension direction. Since the surfaces for emitting the diffracted light are continuous in the extension direction, the brightness of the diffracted light emitted in the plane extending in the arrangement direction and the thickness direction of the uneven structure is increased accordingly, as compared with a structure in which the protrusion surfaces are arranged at regular intervals in the extension direction as well as in the arrangement direction.

DESCRIPTION OF EXEMPLARY EMBODIMENTS

First Embodiment

Referring to FIGS. 1 to 7, a first embodiment of a display according to present disclosure is described below. In the following descriptions, the structure of the display and then the operation of the display are described.

[Structure of Display]

Figure 1:
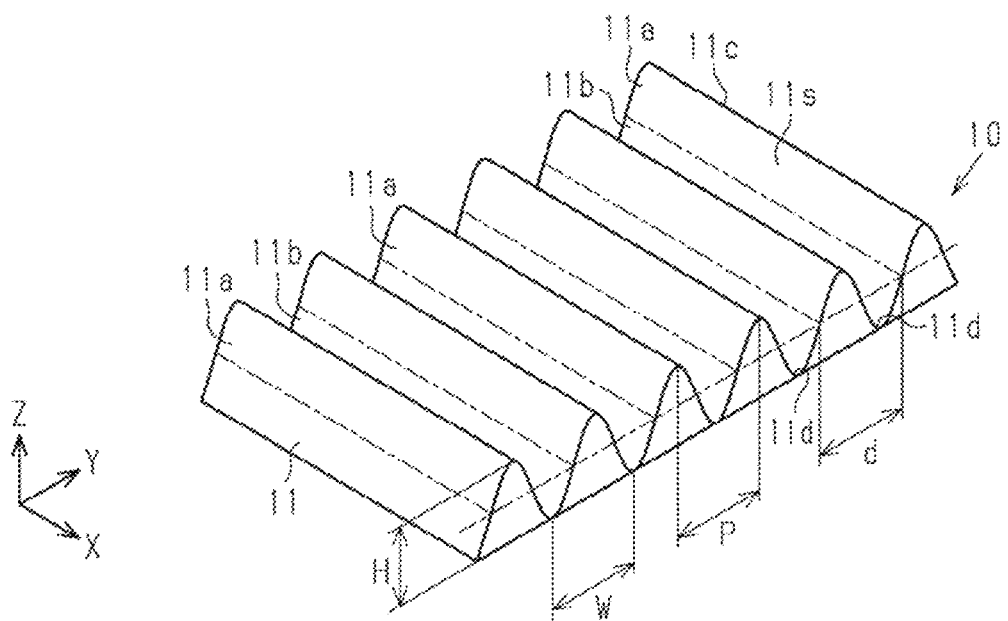
FIG. 1 is a partial perspective view showing a part of the structure of the uneven surface of a display of a first embodiment.

Referring to FIG. 1, the structure of the display is now described.

As shown in FIG. 1, a display 10 includes an uneven structure 11 having an uneven surface 11s, which serves as an incident surface on which light is incident. The uneven surface 11s includes protrusion surfaces 11a and depression surfaces 11b, which alternate in the Y direction, which is one direction and an example of an arrangement direction.

Each protrusion surface 11a has the shape of a strip extending in the X direction, which is perpendicular to the Y direction and serves as an example of an extension direction. The protrusion surface 11a tapers toward the top section 11c in the Z direction, which is perpendicular to the X direction and the Y direction and extends in the thickness direction of the uneven structure 11. The length in the X direction of each protrusion surface 11a is significantly longer than the length in the Y direction. Each protrusion surface 11a is substantially identical in shape with the other protrusion surfaces 11a.

Each depression surface 11b has the shape of a strip extending in the X direction. The depression surface 11b tapers toward the bottom section 11d in the Z direction. The length in the X direction of each depression surface 11b is significantly longer than the length in the Y direction. The distance in the Z direction between the top sections 11c of the protrusion surfaces 11a and the bottom sections 11d of the depression surfaces 11b is a height H of the uneven surface 11s.

The top sections 11c are arranged at a predetermined pitch P in the Y direction. That is, the pitch P is the distance between two top sections 11c adjacent to each other in the Y direction. One protrusion surface 11a and two depression surfaces 11b located on opposite sides of the protrusion surface 11a in the Y direction form a structure having a maximum width W, which is the maximum value of width in the Y direction. The maximum width W is equal to the pitch P.

In the uneven surface 11s, the length in the Y direction of a repetition unit of a protrusion surface 11a and a depression surface 11b is referred to as a period d. In the uneven surface 11s, the period d is equal to the pitch P. However, the period d does not have to be equal to the pitch P. For example, the uneven surface 11s may have pitches P including a first pitch and a second pitch different from the first pitch, and the first and second pitches may alternate in the Y direction. In this case, a protrusion surface 11a and a depression surface 11b that are adjacent to each other in the Y direction form a set of uneven surfaces, and one repetition unit is formed by two sets of uneven surfaces adjacent to each other in the Y direction. The period d here is the sum of the first pitch and the second pitch.

In another example of the uneven surface 11s, uneven surfaces having a first height as the distance between the top sections 11c and the bottom sections 11d and uneven surfaces having a second height, which differs from the first height, as the distance between the top sections 11c and the bottom sections 11d may alternate in the Y direction, while the top sections 11c are arranged at a predetermined pitch P. In this structure, the repetition unit is formed by two sets of uneven surfaces adjacent to each other in the Y direction, and the period d is twice as long as the pitch P.

The uneven surface 11s is configured so as to limit reflection of the light, which is incident on the uneven surface 11s, in a front-view direction, which is the direction in which the uneven surface 11s is viewed from the front. In addition, the uneven surface 11s is configured so that the light incident on the uneven surface 11s is emitted as diffracted light in the oblique view direction of the uneven surface 11s.

That is, in the uneven surface 11s, the protrusion surfaces 11a and the depression surfaces 11b are arranged at a period that limits reflection of the incident light on the uneven surface 11s in the front-view direction, which is the direction in which the uneven surface 11s is viewed from the front, and diffracts the light incident on the uneven surface 11s to emit diffracted light in the oblique view direction of the uneven surface 11s. The uneven structure 11 has a property of absorbing light incident on the uneven structure 11.

The pitch P of the top sections 11c of the protrusion surfaces 11a is between 200 nm and 500 nm inclusive and preferably less than or equal to the shortest wavelength of visible light, for example, 400 nm or less. The protrusion surfaces 11a are arranged regularly in the Y direction such that the distance between adjacent top sections 11c is the pitch P. The pitch P of the bottom sections 11d of the depression surfaces 11b is between 200 nm and 500 nm inclusive and preferably less than or equal to the shortest wavelength of visible light, for example, 400 nm or less. The depression surfaces 11b are arranged regularly in the Y direction such that the distance between adjacent bottom sections 11d is the pitch P. In the uneven surface 11s, the protrusion surfaces 11a, which are substantially identical in shape, and the depression surfaces 11b, which are substantially identical in shape, are arranged regularly, allowing the uneven surface 11s to function as a diffraction grating.

The height H of the uneven surface 11s is preferably greater than or equal to half the pitch P of the protrusion surfaces 11a. When the height H of the uneven surface 11s is greater than or equal to half the pitch P, the uneven surface 11s is able to limit reflection of incident light in the front-view direction of the display 10, that is, the Z direction. In addition, the height H of the uneven surface 11s is preferably greater than the pitch P, since such a structure limits reflection of incident light more effectively than a structure in which the height H of the uneven surface 11s is less than or equal to the pitch P. In other words, the height H of the uneven surface 11s is preferably greater than or equal to 200 nm, more preferably greater than or equal to 500 nm.

Further, the height H of the uneven surface 11s is preferably less than or equal to 750 nm in order for the uneven surface 11s to be formed with precision that allows the uneven surface 11s to properly function to limit reflection and emit diffracted light.

Each protrusion surface 11a is a tapered surface that tapers toward the top section 11c, and each depression surface 11b is a tapered surface that tapers toward the bottom section 11d. The cross-sectional shape in the YZ plane of the structure formed by the uneven surface 11s includes a plurality of triangular shapes. The vertices of the triangles have a curvature, and the cross-sectional shape in the YZ plane is uniform in the X direction.

Each of the shapes defined in the cross sectional along the YZ plane of the structure formed by the uneven surface 11s may be the cross-sectional shape of a plane passing through the axis of one of the shapes listed below, and the cross-sectional shape in the YZ plane is uniform in the X direction. That is, each shape in the cross-sectional shape in the YZ plane may be the cross-sectional shape of a plane passing through the axis of a half-spindle shape, a conical shape, a pyramidal shape, a truncated conical shape, or a truncated pyramidal shape. Further, in the structure formed by the uneven surface 11s, the cross-sectional shape in the YZ plane is uniform in the X direction. Each of the protrusion surfaces 11a and the depression surfaces 11b may be a step-like surface having steps in the Z direction.

Figure 2:
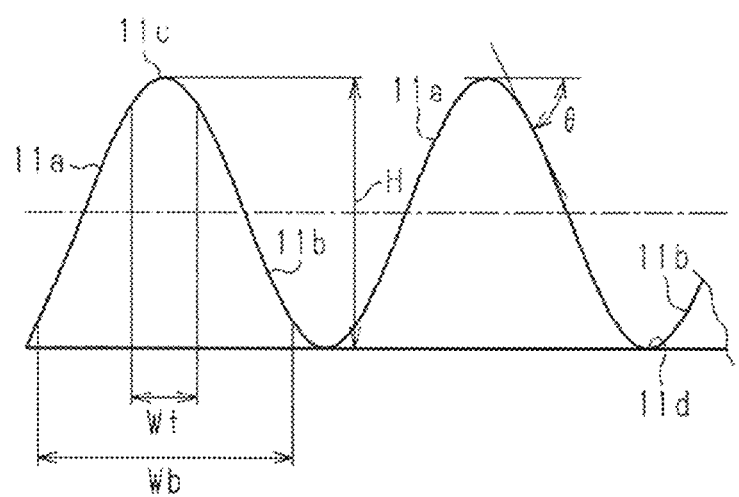
FIG. 2 is a partial cross-sectional view showing a part of the cross-sectional structure of the display in the YZ plane.

As shown in FIG. 2, in the uneven surface 11s, the curvature of the top sections 11c of the protrusion surfaces 11a is equal to the curvature of the bottom sections 11d of the depression surfaces 11b. In addition, the curvature of the top sections 11c and the curvature of the bottom sections 11d are greater than the curvatures of the sections in the uneven surface 11s other than the top sections 11c and the bottom sections 11d.

In the cross section of the protrusion surfaces 11a along the YZ plane, the tangents of the top sections 11c form an inclination angle $\theta$ with the tangents of the sections other than the top sections 11c. The inclination angle $\theta$ is preferably between 50° and 80° inclusive so as to limit reflection of light in the Z direction.

The gradient S in the Z direction of the surfaces connecting the top sections 11c and the bottom sections 11d in the uneven surface 11s is defined by Expression (1) below.

$$S=|\log_{10}(Wb/Wt)|^{-1} \qquad (1)$$

In Expression (1), the base width Wb is a width of the structure formed by two depression surfaces 11b adjacent to each other in the Y direction and the protrusion surface 11a continuous with the two depression surfaces 11b. The base width Wb is measured at a position closer in the Z direction to the top sections 11c than the bottom sections 11d by 0.1×H. The top width Wt is the width of the structure measured at a position closer in the Z direction to the top section 11c than the bottom sections 11d by 0.9×H. The gradient S is preferably less than 25. The uneven surface 11s having a gradient S of less than 25 allows the areas of the flat surfaces forming the top sections 11c of the protrusion surfaces 11a and the areas of the flat surfaces forming the bottom sections 11d of the depression surfaces 11b to be suitable for limiting reflection of light on the uneven surface 11s.

[Operation of Display]

Referring to FIGS. 3 to 7, the operation of the display 10 is described after the descriptions on the diffraction grating.

[Diffraction Grating]

The diffraction grating emits diffracted light of a high brightness in a predetermined direction with respect to the direction of travel of the illumination light, which is the incident light. The emission angle $\beta$ of mth-order diffracted light (m=0, ±1, ±2, . . . ) is given by Expression (2) below when the light travels in the plane that is orthogonal to the length direction of the grooves of the diffraction grating.

$$d=m\lambda/(\sin \alpha - \sin \beta) \qquad \text{Expression (2)}$$

In Expression (2), d is the period of the diffraction grating, m is the diffraction order, and $\lambda$ is the wavelength of the incident light and the diffracted light. In addition, $\alpha$ is the emission angle of the transmitted light or regular reflection light, which is zeroth-order diffracted light. That is, the absolute value of a is equal to the incident angle of the illumination light. When the diffraction grating is a reflective diffraction grating, the incident direction of the illumination light and the emission direction of the regular reflection light are symmetrical with respect to the front-view direction, which is the direction in which the diffraction grating is viewed from the front.

When the diffraction grating is a reflective diffraction grating, the angle $\alpha$ is greater than or equal to 0° and less than 90°. When the angle of the front-view direction, which is 0°, is the boundary value and the illumination light is oblique to the diffraction grating, the angular range including the emission direction of the regular reflection light is the positive angular range, while the angular range including the incident direction of the illumination light is the negative angular range. When the emission direction of the diffracted light and the emission direction of the regular reflection light are within the same angular range, that is, within the positive angular range, the angle $\beta$ is a positive value. When the emission direction of the diffracted light and the incident direction of the illumination light are within the same angular range, that is, within the negative angular range, the angle $\beta$ is a negative value.

When the observer views the diffraction grating in the front-view direction of the diffracted light emitted by the diffraction grating, only the diffracted light having an emission angle $\beta$ of 0° forms an image perceivable by the observer. When the period d is greater than the wavelength $\lambda$, the wavelengths $\lambda$ and incident angles $\alpha$ that satisfy Expression (2) exist. As a result, the observer perceives the diffracted light having wavelengths $\lambda$ that satisfy Expression (2).

In contrast, when the period d is less than the wavelength $\lambda$, an incident angle $\alpha$ that satisfies Expression (2) does not exist, so that the observer who views the diffraction grating in the front-view direction cannot perceive diffracted light.

That is, a diffraction grating having a small period d, that is, a diffraction grating having a period d less than the wavelength λ, does not emit diffracted light in the front-view direction. A diffraction grating having a period d that is about the same as the wavelength A emits diffracted light that is hardly perceivable in the front-view direction.

Figure 3:
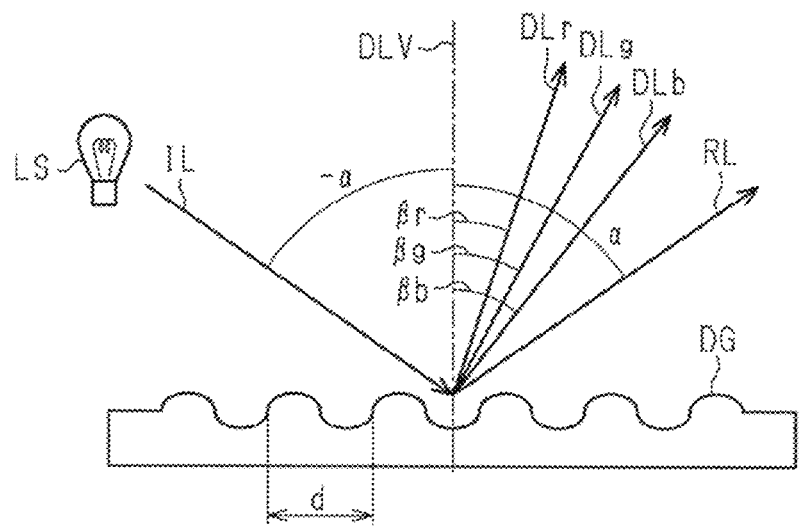
FIG. 3 is a schematic view of the state in which a diffraction grating having a period greater than the shortest wavelength of visible light emits first-order diffracted light.
Figure 4:
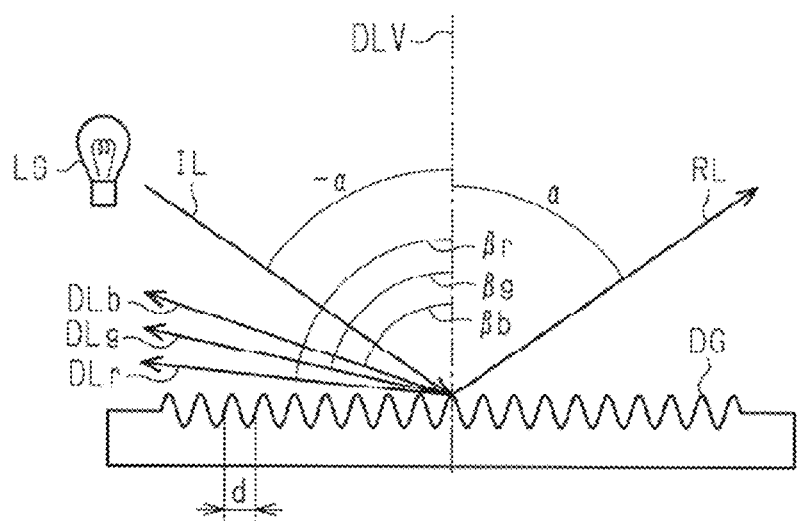
FIG. 4 is a schematic view of the state in which a diffraction grating having a period less than the shortest wavelength of visible light emits first-order diffracted light.

Referring to FIGS. 3 and 4, the diffraction grating is described in further detail. FIG. 3 shows a diffraction grating having a period d greater than the shortest wavelength of visible light, and FIG. 4 shows a diffraction grating having a period d less than the shortest wavelength of visible light. For the sake of the convenience in illustration and description, FIGS. 3 and 4 only show red diffracted light, green diffracted light, and blue diffracted light as first-order diffracted light emitted from the diffraction gratings.

As shown in FIG. 3, the diffraction grating DG has a period d that is greater than the shortest wavelength of visible light, for example, 400 nm. Illumination light IL emitted by a light source LS is white light consisting of light rays of different wavelengths. When the illumination light IL is incident on the diffraction grating DG obliquely, the diffraction grating DG emits emission light RL, which is regular reflection light or zero-order diffracted light.

The diffraction grating DG also emits red diffracted light DLr, green diffracted light DLg, and blue diffracted light DLb as first-order diffracted light created by dispersing the illumination light IL. The emission angle βr of the red diffracted light DLr, the emission angle µg of the green diffracted light DLg, and the emission angle βb of the blue diffracted light DLb are positive values in the positive angular range with respect to the front-view direction DLV.

The diffraction grating DG shown in FIG. 4 has a period d that is greater than half the shortest wavelength of visible light and less than the shortest wavelength of visible light, that is, greater than 200 nm and less than 400 nm.

When illumination light IL is incident on the diffraction grating DG obliquely, the diffraction grating DG emits red diffracted light DLr, green diffracted light DLg, and blue diffracted light DLb as first-order diffracted light, in a similar manner as the diffraction grating DG described referring to FIG. 3. However, the emission angle βr of the red diffracted light DLr, the emission angle βg of the green diffracted light DLg, and the emission angle βb of the blue diffracted light DLb are negative values.

For example, when the incident angle α of the illumination light IL is 50° and the period d is 330 nm, the diffraction grating DG diffracts the illumination light IL and emits green light having a wavelength of 540 nm as green diffracted light DLg, which is first-order diffracted light, at an emission angle µg of −60°.

[Display]

Figure 5:
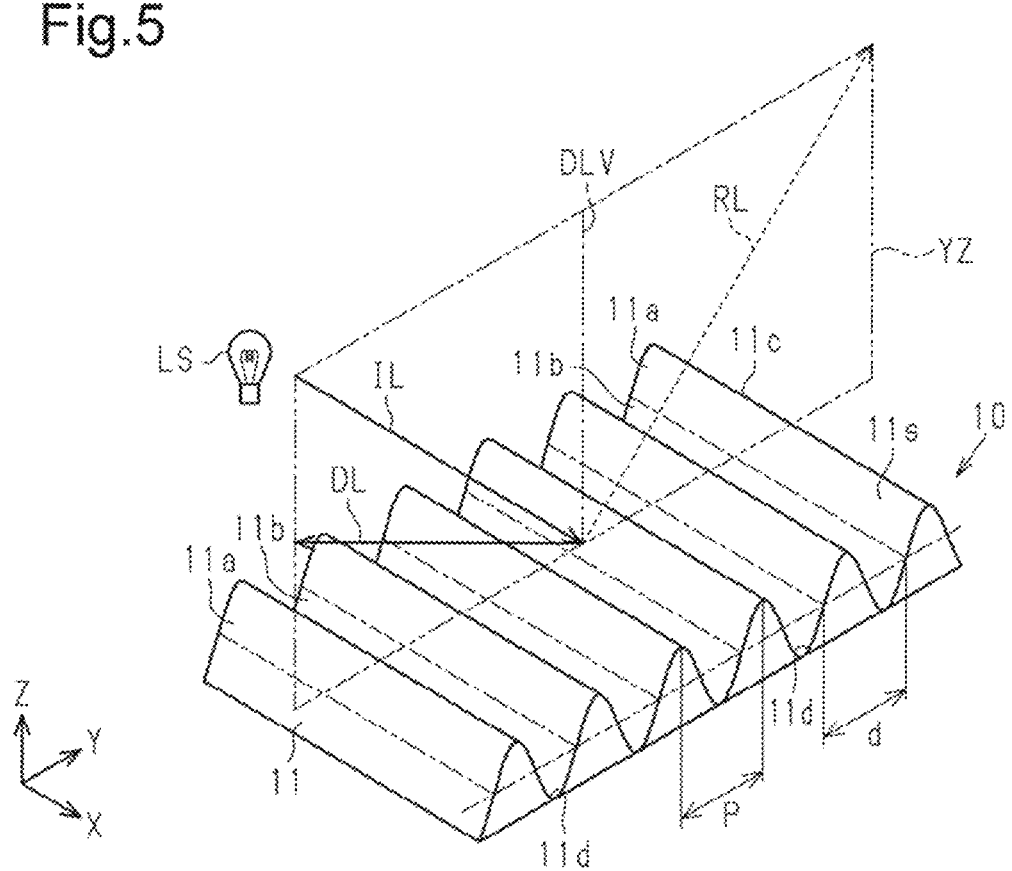
FIG. 5 is a diagram for illustrating the operation of the uneven surface when viewed obliquely.
Figure 6:
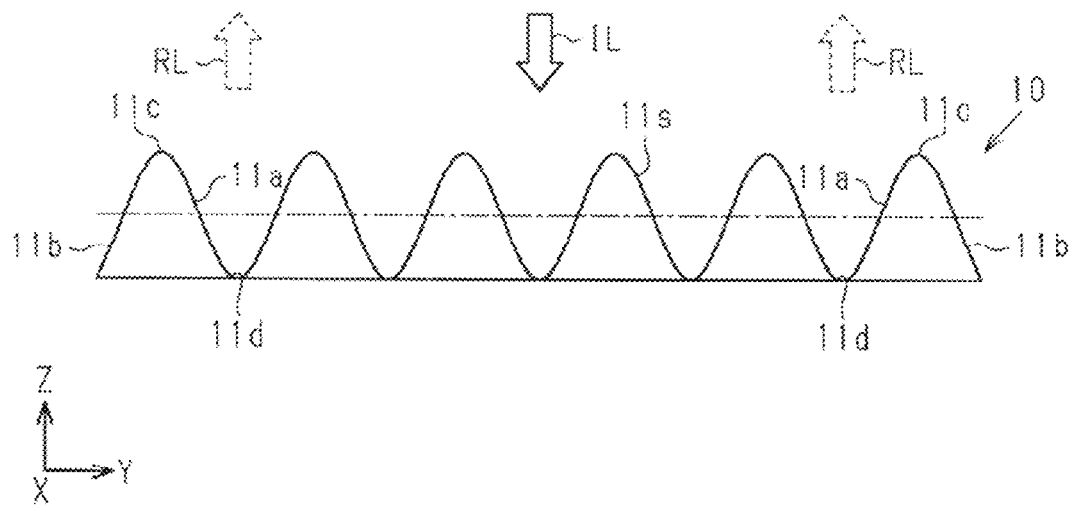
FIG. 6 is a diagram for illustrating the operation of the uneven surface when viewed from the front.
Figure 7:
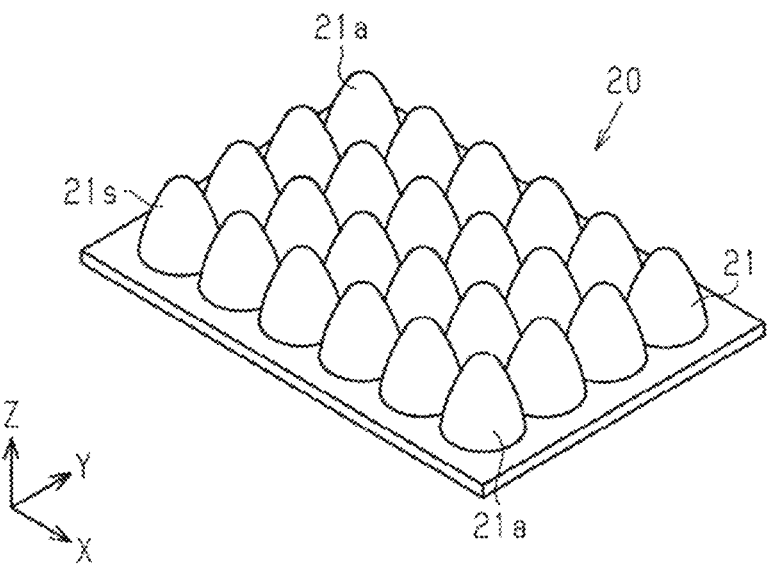
FIG. 7 is a perspective view showing the structure of a conventional display.

Referring to FIGS. 5 to 7, the operation of the display 10 is now described.

As shown in FIG. 5, in the uneven surface 11s of the display 10, a plurality of top sections 11c are arranged at a predetermined period d in the Y direction, that is, arranged at a predetermined pitch P, and the period d is between 200 nm and 500 nm inclusive. Each of the protrusion surfaces 11a and the depression surfaces 11b has the shape of a strip extending in the X direction.

Accordingly, when white illumination light IL emitted by the light source LS is incident on the uneven surface 11s obliquely, the uneven surface 11s emits diffracted light DL in the YZ plane YZ including the front-view direction DLV. The diffracted light DL is emitted toward the side of the YZ plane YZ opposite to the emission light RL with respect to the front-view direction DLV. Alternatively, diffracted light DL is emitted toward the side of the YZ plane YZ that is the same as the emission light RL with respect to the front-view direction DLV to an extent that is hardly perceived, while diffracted light DL is emitted on the side opposite to the emission light RL with respect to the front-view direction DLV to an extent that is easily perceived.

The period d of the uneven surface 11s is preferably between 200 nm and 400 nm inclusive so as to limit reflection of the diffracted light DL toward the side of the YZ plane YZ that is the same as the emission light RL with respect to the front-view direction DLV.

The display 10 having the uneven surface 11s thus emits diffracted light DL in the YZ plane YZ, which is perpendicular to the direction in which the protrusion surfaces 11a extend. This increases the directivity of the diffracted light DL emitted by the display 10. In addition, the diffracted light DL is emitted by the uneven surface 11s, which is formed by the protrusion surfaces 11a and the depression surfaces 11b extending in the X direction. This increases the intensity of the diffracted light in the emission direction of the diffracted light as compared with a structure in which the surfaces for emitting diffracted light are arranged separately in the X direction.

When an observer views an article, particularly a light absorbing article that emits reflection light or scattered light of low brightness, the observer typically adjusts the positional relationship between the article and the light source with respect to the viewpoint of the observer so as to perceive the regular reflection light emitted from the article.

As described above, the display 10 emits diffracted light on the side opposite to the emission light RL including the regular reflection light with respect to the front-view direction DLV. Thus, an observer who does not know the direction in which the diffracted light DL is emitted is likely to fail to perceive the diffracted light emitted by the display 10 when viewing the display 10. As such, the observer is unlikely to recognize that the display 10 has the function of emitting diffracted light.

In contrast, with a display that emits diffracted light on the same side as the regular reflection light with respect to the front-view direction, the observer of this display is likely to perceive the diffracted light emitted by the display even if the observer does not know that the display has the function of emitting diffracted light.

As shown in FIG. 6, in the uneven surface 11s, the protrusion surfaces 11a are tapered toward the top sections 11c, and the depression surfaces 11b are tapered toward the bottom sections 11d. In the uneven surface 11s, the top sections 11c are arranged at a pitch P of between 200 nm and 500 nm inclusive, and the bottom sections 11d are arranged at a pitch P of between 200 nm and 500 nm inclusive. Thus, when the display 10 is viewed from the side from which light is incident on the uneven surface 11s of the display 10, the reflectance of the regular reflection light emitted from the display 10 is low according to the principle described below, regardless of the angle of view.

Light is reflected at the interface where the refractive index varies continuously. When the areas of flat surfaces in the top sections 11c of the protrusion surfaces 11a and the bottom sections 11d of the depression surfaces 11b are small, these sections reflect small amounts of light.

When the pitch P of the protrusion surface 11a is approximately less than or equal to the resolution limit wavelength, the refractive index at a horizontal plane, which is perpendicular to the depth direction of the protrusion surfaces 11a, or the entry direction of light, is determined by the ratio between the uneven structure 11 and the air around the uneven structure 11 in the horizontal plane. Since the pitches of the protrusions and depressions are less than the resolution limit, the refractive index is considered to be uniform in the horizontal direction.

When the shape of the protrusion surfaces 11a changes substantially continuously in the depth direction of the protrusion surfaces 11a, the refractive index at the horizontal plane changes uniformly and continuously in accordance with the depth of the protrusions surfaces 11a. This reduces the influence of the interface between refractive indexes, which causes reflection of light, in the inclined sections.

The uneven structure 11 has a property of absorbing the light incident on the uneven structure 11. That is, the uneven structure 11 includes a section that absorbs the light transmitted through the uneven surface 11s, which is the light incident surface, and is located on the side of the uneven surface 11s opposite to the side on which light is incident. In addition, the uneven structure 11 has a light permeability that transmits light to the absorption section. In other words, the uneven structure 11 includes a section that converts the light transmitted through the uneven surface 11s into thermal energy within the uneven structure 11 and the light permeability that transmits light to the section that converts light into thermal energy.

The section of the uneven structure 11 that absorbs light may have the function of reflecting light as long as the uneven structure 11 absorbs the light incident on the absorption section through the multiple reflection effect.

As described above, the display 10 emits diffracted light on the side opposite to the regular reflection light with respect to the front-view direction DLV to an extent that is easily perceived by the observer, whereas the display 10 substantially emits no diffracted light in the front-view direction.

Accordingly, the display 10 displays an image in black or grey, for example, in the front-view direction. An image in black is displayed when white light is emitted in the front-view direction and the reflectance of all wavelengths of light from 400 nm to 700 nm is less than or equal to 10%. The reflectance is obtained by measuring the intensity of regular reflection light. An image in grey is displayed when white light is emitted in the front-view direction and the reflectance of all wavelengths of light from 200 nm to 700 nm is greater than 10% and less than about 25%. The reflectance is obtained by measuring the intensity of regular reflection light.

In order for the display 10 to display an image in black, the uneven surface 11s preferably has a greater height H, which reduces the change rate of the refractive index in the Z direction in the uneven surface 11s. A less height H of the uneven surface 11s increases the reflectance of the uneven surface 11s and thus the lightness of the image displayed by the display 10. As a result, the display 10 displays an image in grey.

For example, when the pitch P is 500 nm and the height H of the uneven surface 11s is greater than or equal to 250 nm, the display 10 displays an image in grey. A greater height H of the uneven surface 11s reduces the lightness of the image displayed by the display 10. When the height H of the uneven surface 11s is greater than or equal to 500 nm, the display 10 displays an image that is substantially black.

On the other hand, when the height H of the uneven surface 11s exceeds 750 nm, that is, when the aspect ratio of the uneven surface 11s is greater than 1.5, any further increase in height H of the uneven surface 11s hardly changes the lightness of the image displayed by the display 10. In addition, when the aspect ratio exceeds 1.5, the uneven structure 11 is more difficult to manufacture with high precision than an uneven structure having an aspect ratio of less than or equal to 1.5.

For this reason, the height H of the uneven surface 11s is preferably between 200 nm and 750 nm inclusive.

FIG. 7 shows a conventional display 20 including an uneven structure 21 having an uneven surface 21s, which serves as a light incident surface of the uneven structure 21. The uneven surface 21s includes a plurality of protrusion surfaces 21a arranged regularly in the X direction and the Y direction.

The regular arrangement of the protrusion surfaces 21a in the X direction and the Y direction allows the display 20 to emit diffracted light. However, the protrusion surfaces 21a are arranged separately in the X direction and the Y direction. Thus, as compared with a structure like the display 10 having the protrusion surfaces 11a extending in the X direction, the area of the surfaces for emitting diffracted light in the YZ plane is small, reducing the brightness of the diffracted light emitted in the YZ plane.

Further, since the protrusion surfaces 21a are arranged regularly in the X direction and the Y direction, the protrusion surfaces 21a are arranged substantially regularly also in other directions, such as a direction that is at about 27° to the X direction and a direction that is at 45° to the X direction. As a result, the diffracted light emitted by the display 20 may be perceived in a larger angular range than that for the display 10.

The display of the first embodiment has the following advantage.

(1) The protrusion surfaces 11a and the depression surfaces 11b alternate in the Y direction and extend in the X direction. This allows the uneven surface 11s to emit diffracted light in the YZ plane. The directivity in the emission direction of the diffracted light is thus increased. The protrusion surfaces 11a and the depression surfaces 11b in the uneven surface 11s extend in the X direction. Since the surfaces for emitting the diffracted light are continuous in the X direction, the brightness of the diffracted light emitted in the YZ plane is increased accordingly, as compared with a structure in which the protrusion surfaces are arranged at regular intervals in the X direction and the Y direction.

[Modifications of First Embodiment]

The above-described first embodiment may be modified as follows.

The top sections 11c and the bottom sections 11d may be flat surfaces. In the first embodiment, the top sections 11c and the bottom sections 11d are surfaces having curvature. As such, the pitch P of the top sections 11c is equal to the maximum width W. However, when the top sections 11c and the bottom sections 11d are flat surfaces, the pitch P of the top sections 11c is greater than the maximum width W.

The heights H of the uneven surface 11s may include different values. As described above, when the uneven surface 11s includes a section having a first height and a section having a second height, which differs from the first height, these sections differ from each other in the effect of limiting reflection of incident light. In order for the entire uneven surface 11s to produce the same degree of effect of limiting reflection of incident light, that is, to limit variation in the lightness of the image displayed by the display 10 in the front-view direction of the display 10, it is desirable that the height of the uneven surface 11s is substantially uniform over the entire uneven surface 11s.

Second Embodiment

Referring to FIGS. 8 to 24, a second embodiment of a display according to the present disclosure is now described.

The display of the second embodiment includes components equivalent to those of the display of the first embodiment. The same reference numerals are given to those components that are the same as the corresponding components of the first embodiment. Such components will not be described in detail. The second embodiment is an example in which the pitch and the period of the uneven surface are the same value.

In the following descriptions, the structure of the display, the operation of the display, the method for manufacturing the display, and the structure of an article that uses the display are described in this order.

[Structure of Display]

Referring to FIGS. 8 to 14, the structure of the display is now described.

Figure 8:
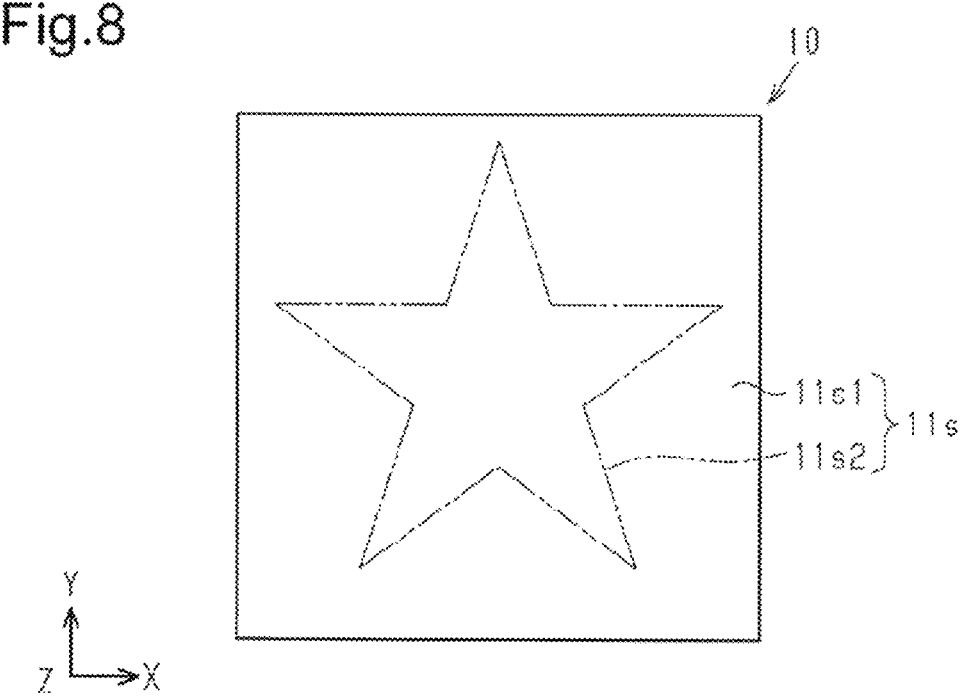
FIG. 8 is a plan view showing the planar structure of a display of a second embodiment.

As shown in FIG. 8, a display 10 includes an uneven surface 11s, which is a light incident surface. The uneven surface 11s includes a first region 11s1 and a second region 11s2. The first region 11s1 and the second region 11s2 each include a plurality of protrusion surfaces and a plurality of depression surfaces.

The side from which light is incident on the uneven surface 11s is the observation side, and a point at a predetermined position on the observation side is a fixed point. The brightness of the diffracted light emitted from the first region 11s1 toward the fixed point differs from the brightness of the diffracted light emitted from the second region 11s2 toward the fixed point, so that the uneven surface 11s is configured such that the image displayed by the first region 11s1 is visually distinguished from the image displayed by the second region 11s2 at the fixed point. The brightness of the diffracted light is a first property, and the first property is one of the properties of the diffracted light.

The display 10 displays an image to an observer who views the display 10 from the fixed point on the observation side. The image is formed by the difference between the brightness of the diffracted light emitted from the first region 11s1 and the brightness of the diffracted light emitted from the second region 11s2. Accordingly, as compared with a structure in which one type of diffracted light is emitted from the entire uneven surface 11s, the image displayed in the oblique view direction of the uneven surface 11s, which is one of the images displayed by the uneven surface 11s, is complex.

The uneven surface 11s of the display 10 is configured such that the lightness of the image displayed by the first region 11s1 in the front-view direction and the lightness of the image displayed by the second region 11s2 in the front-view direction are substantially equal to each other in the front-view direction of the display 10.

The image displayed by the display 10 in the front-view direction of the display 10 is perceived as one image, and the image formed by the difference between the brightness of the diffracted light from the first region 11s1 and the brightness of the diffracted light from the second region 11s2 is hidden from the observer who views the display 10 in the front-view direction of the display 10.

Figure 9:
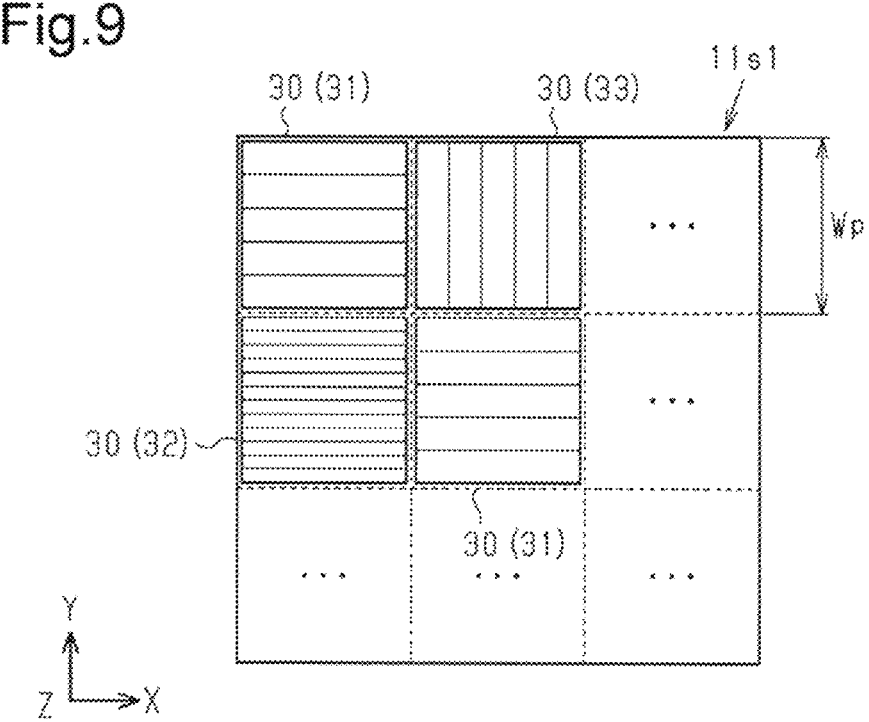
FIG. 9 is an enlarged plan view showing a part of the planar structure of a first region in an uneven surface.

As shown in FIG. 9, the first region 11s1 is partitioned into a plurality of pixels 30. Each pixel 30 is square as viewed in the Z direction. The pixels 30 are arranged in the X direction and the Y direction. In other words, the pixels 30 are arranged in a square lattice.

As viewed in the Z direction, the length of one side of each pixel 30 is a maximum width Wp, which is between 3 µm and 300 µm inclusive. The maximum width Wp that is less than or equal to 300 µm prevents the observer from discerning the pixels 30 when the display 10 is viewed with the naked eye. The maximum width Wp that is greater than or equal to 3 µm allows the density of the arranged protrusion surfaces and depression surfaces in the uneven surfaces of the pixels 30 and the precision of shapes of the uneven surfaces to be increased so that the pixels 30 adequately function as a diffraction grating and limit reflection of light.

As viewed in the Z direction, each pixel 30 may have a circular shape, a polygonal shape other than a square shape, such as a triangular shape, or a tetragonal shape other than a square shape. Even when the pixels 30 have such shapes, the maximum width of the pixels 30, which is the length of the longest one of the sides defining each pixel 30, is still preferably between 3 µm and 300 µm inclusive.

Each pixel 30 is a part of the uneven surface 11s and includes a plurality of protrusion surfaces. That is, each pixel 30 also includes a plurality of depression surfaces. The protrusion surfaces and the depression surfaces alternate in the pixels 30.

The pixels 30 forming the first region 11s1 include first pixels 31, second pixels 32, and third pixels 33. A first pixel 31, a second pixel 32, and a third pixel 33 differ from one another in at least one of the direction in which the protrusion surfaces and the depression surfaces extend and the period d. The period d is the length of the repetition unit forming the uneven surface in the direction in which the protrusion surfaces and the depression surfaces alternate.

The pixels 30 forming the first region 11s1 include first pixels 31, second pixels 32, and third pixels 33 in the ratio defined by Expression (3) below.

[First pixel]:[Second pixel]:[Third pixel]=2:1:1    Expression (3)

The whole of each pixel 30 is an uneven surface in which protrusion surfaces and depression surfaces alternate. However, a part of each pixel 30 may be a flat surface as long as the ratio among the sum of the areas of the uneven surfaces in the first pixels 31, the sum of the areas of the uneven surfaces in the second pixels 32, and the sum of the areas of the uneven surfaces in the third pixels 33 satisfies Expression (3).

Figure 10:
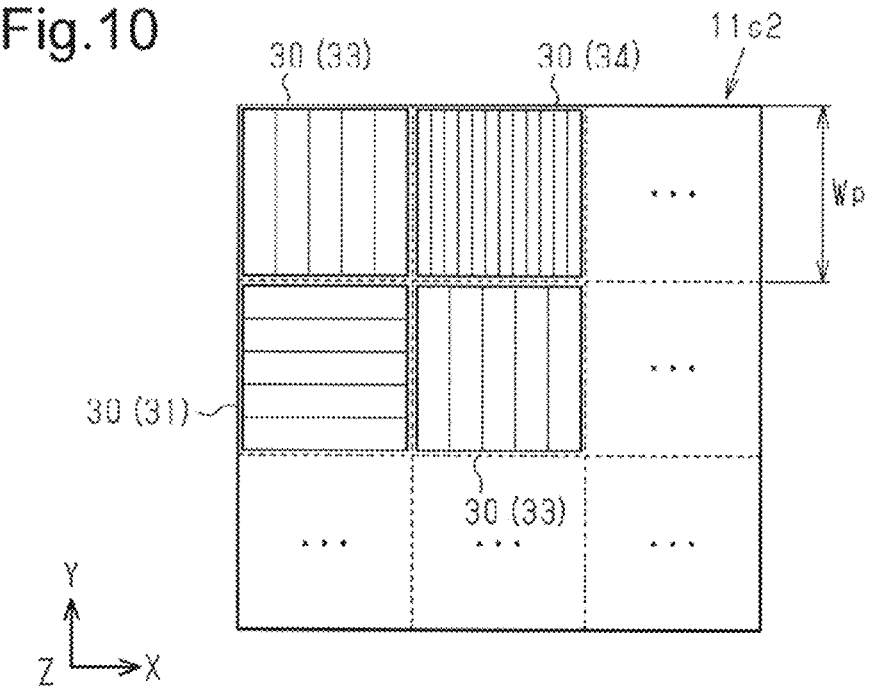
FIG. 10 is an enlarged plan view showing a part of the planar structure of a second region in the uneven surface.

As shown in FIG. 10, the second region 11s2 is partitioned into a plurality of pixels 30 in the same manner as the first region 11s1. Each pixel 30 is square as viewed in the Z direction. The pixels 30 are arranged in the X direction and the Y direction. In other words, the pixels 30 are arranged in a square lattice.

As viewed in the Z direction, the maximum width Wp of each pixel 30 is between 3 µm and 300 µm inclusive, as is the case with the first region 11s1. As viewed in the Z direction, each pixel 30 may have a circular shape or a polygonal shape other than a square shape, as is the case with the first region 11s1.

Each pixel 30 is a part of the uneven surface 11s and includes a plurality of protrusion surfaces. That is, each pixel 30 also includes a plurality of depression surfaces. The protrusion surfaces and the depression surfaces alternate in the pixel 30.

The pixels 30 forming the second region 11s2 include first pixels 31, third pixels 33, and fourth pixels 34. The first pixels 31 are identical to the first pixels 31 of the first region 11s1 in structure, and the third pixels 33 are identical to the third pixels 33 of the first region 11s1 in structure.

The fourth pixels 34 differ from the first pixels 31, the second pixels 32, and the third pixels 33 in at least one of the direction in which the protrusion surfaces and the depression surfaces extend and the period d.

The pixels 30 forming the second region 11s2 include first pixels 31, third pixels 33, and fourth pixels 34 in the ratio defined by Expression (4) below.

[First pixel]:[Third pixel]:[Fourth pixel]=1:2:1       Expression (4)

The whole of each pixel 30 is an uneven surface in which protrusion surfaces and depression surfaces alternate. However, a part of each pixel may be a flat surface. A part of each pixel may be a flat surface as long as the ratio among the sum of the areas of the uneven surfaces in the first pixels 31, the sum of the areas of the uneven surfaces in the third pixels 33, and the sum of the areas of the uneven surfaces in the fourth pixels 34 satisfies Expression (4).

Figure 11:
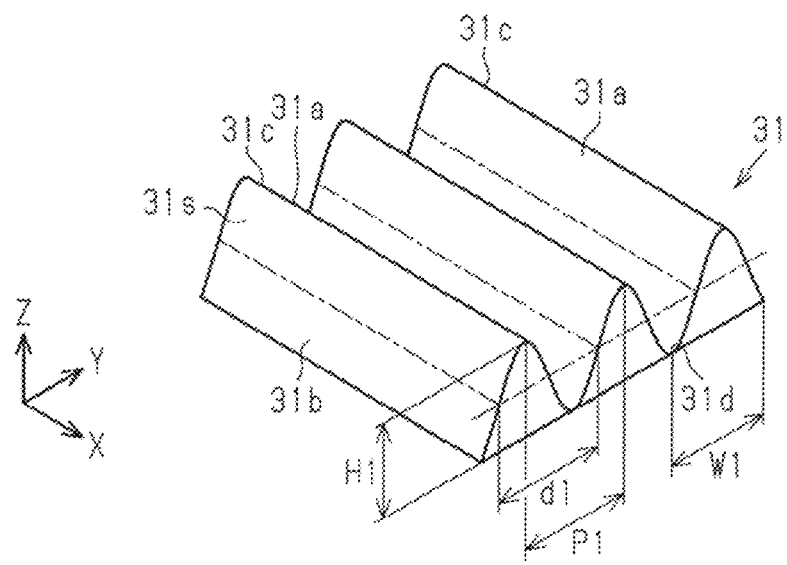
FIG. 11 is a partial perspective view showing a part of the structure of the first uneven surface of a first pixel.

As shown in FIG. 11, a first pixel 31, which is an example of a first arrangement pixel and also an example of a first period pixel, includes a first uneven surface 31s forming a part of the uneven surface 11s. The first uneven surface 31s includes first protrusion surfaces 31a and first depression surfaces 31b alternating in the Y direction, which is an example of a first arrangement direction. The first protrusion surfaces 31a extend in the X direction, which is an example of a first extension direction, and the first depression surfaces 31b also extend in the X direction.

Each first protrusion surface 31a includes a first top section 31c, and the first top sections 31c are arranged at a first pitch P1 in the Y direction. In the first uneven surface 31s, a first protrusion surface 31a and a first depression surface 31b that are adjacent to each other in the Y direction form a repetition unit, and the length in the Y direction of the repetition unit is a first period d1. In the first uneven surface 31s, the maximum width described above is the first maximum width W1, which is equal to the first period d1. As is the case with the period d described above, the first period d1 is a predetermined value between 200 nm and 500 nm inclusive, preferably less than or equal to 400 nm. In the first uneven surface 31s, the distance between the first top sections 31c of the first protrusion surfaces 31a and the first bottom sections 31d of the first depression surfaces 31b is a first height H1.

In each first pixel 31, the first protrusion surfaces 31a and the first depression surfaces 31b extend in the X direction so that the first pixel 31 emits diffracted light toward a first fixed point in the YZ plane. The first fixed point is at a predetermined position on the observation side. The diffracted light emitted toward the first fixed point from the first pixel 31 has a wavelength determined by the first period d1.

Figure 12:
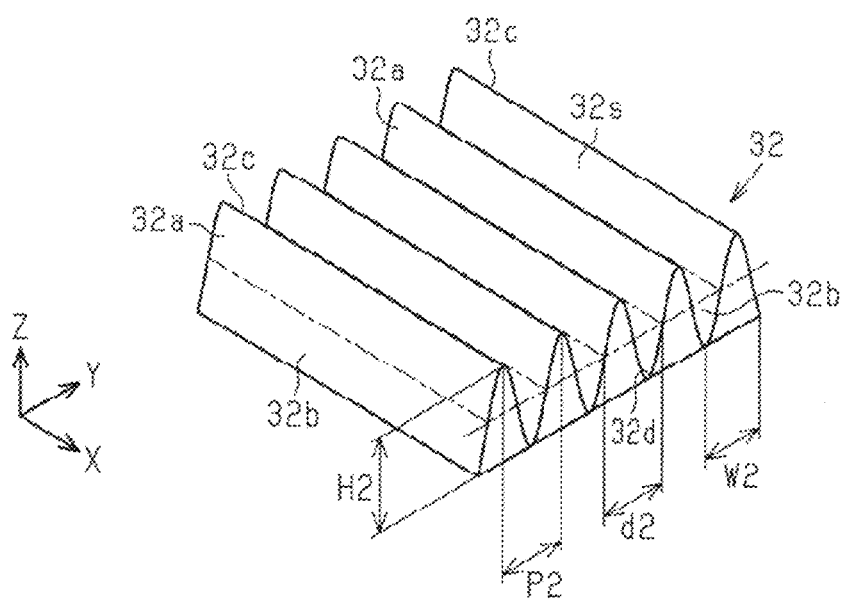
FIG. 12 is a partial perspective view showing a part of the structure of the second uneven surface of a second pixel.

As shown in FIG. 12, a second pixel 32, which is an example of a first arrangement pixel and also an example of a second period pixel, includes a second uneven surface 32s forming a part of the uneven surface 11s. The second uneven surface 32s includes second protrusion surfaces 32a and second depression surfaces 32b, which alternate in the Y direction. The second protrusion surfaces 32a and the second depression surfaces 32b extend in the X direction.

Each second protrusion surface 32a has the shape of a strip extending in the X direction and tapers toward the second top section 32c in the Z direction. Each second depression surface 32b has a shape of a strip extending in the X direction and tapers toward the second bottom section 32d in the Z direction.

In a similar manner as the first pixel 31, the second protrusion surfaces 32a and the second depression surfaces 32b of the second pixel 32 are arranged at a period that limits reflection of the light, which is incident on the second pixel 32, in the front-view direction of the second pixel 32 and allows the second pixel 32 to diffract the light incident on the second pixel 32 and emit diffracted light in the oblique view direction of the second pixel 32.

Each second protrusion surface 32a includes a second top section 32c, and the second top sections 32c are arranged at a second pitch P2 in the Y direction. In the second uneven surface 32s, a second protrusion surface 32a and a second depression surface 32b that are adjacent to each other in the Y direction form a repetition unit, and the length in the Y direction of the repetition unit is a second period d2. The maximum width of the second uneven surface 32s is a second maximum width W2, which is equal to the second period d2. The second period d2 is less than the first period d1 and is a predetermined value between 200 nm and 500 nm inclusive, preferably less than or equal to 400 nm.

In the second uneven surface 32s, the distance between the second top sections 32c of the second protrusion surfaces 32a and the second bottom sections 32d of the second depression surfaces 32b is a second height H2, which is equal to the first height H1.

The second protrusion surfaces 32a of the second pixel 32 extend in the X direction, so that the second pixel 32 emits diffracted light toward the first fixed point in a similar manner as the first pixel 31. However, the second period d2 of the second pixel 32 differs from the first period d1 of the first pixel 31, so that the wavelength of the diffracted light, in other words, the color of the diffracted light, emitted from the second pixel 32 toward the first fixed point differs from the wavelength of the diffracted light, or the color of the diffracted light, emitted from the first pixel 31 toward the first fixed point.

Figure 13:
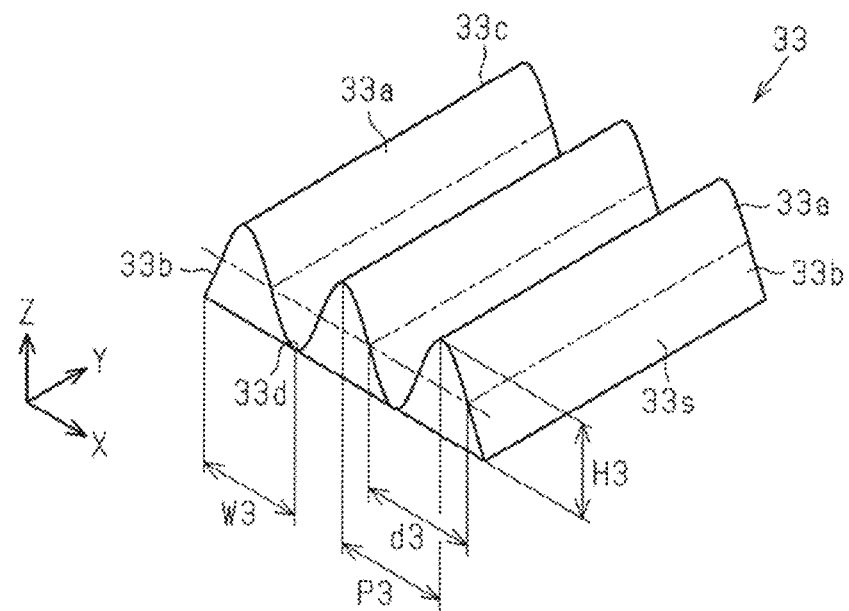
FIG. 13 is a partial perspective view showing a part of the structure of the third uneven surface of a third pixel.

As shown in FIG. 13, a third pixel 33, which is an example of a second arrangement pixel and also an example of a first period pixel, includes a third uneven surface 33s forming a part of the uneven surface 11s. The third uneven surface 33s includes third protrusion surfaces 33a and third depression surfaces 33b alternating in the X direction, which is an example of a second arrangement direction. The third protrusion surfaces 33a extend in the Y direction, which is an example of a second extension direction, and the third depression surfaces 33b also extend in the Y direction.

Each third protrusion surface 33a has the shape of a strip extending in the Y direction and tapers toward the third top section 33c in the Z direction. Each third depression surface 33b has the shape of a strip extending in the Y direction and tapers toward the third bottom section 33d in the Z direction.

In a similar manner as the first pixel 31, the third protrusion surfaces 33a and the third depression surfaces 33b of the third pixel 33 are arranged at a period that limits reflection of the incident light on the third pixel 33 in the front-view direction of the third pixel 33 and allows the third pixel 33 to diffract the light incident on the third pixel 33 and emit diffracted light in the oblique view direction of the third pixel 33.

Each third protrusion surface 33a includes a third top section 33c, and the third top sections 33c are arranged at a third pitch P3 in the X direction. In the third uneven surface 33s, a third protrusion surface 33a and a third depression surface 33b that are adjacent to each other in the X direction form a repetition unit, and the length in the X direction of the repetition unit is a third period d3. The maximum width in the third uneven surface 33s is a third maximum width W3, which is equal to the third period d3. The third period d3 is equal to the first period d1.

In the third uneven surface 33s, the distance between the third top sections 33c of the third protrusion surfaces 33a and the third bottom sections 33d of the third depression surfaces 33b is a third height H3, which is equal to the first height H1.

In the third pixel 33, the third protrusion surfaces 33a extend in the Y direction so that, unlike the first pixel 31 and the second pixel 32, the third pixel 33 emits diffracted light toward a second fixed point in an XZ plane, which differs from the first fixed point in the position on the observation side. On the other hand, the third period d3 of the third pixel 33 is equal to the first period d1.

When the third pixel 33 is observed from the second fixed point, the relative position of the third pixel 33 to the second fixed point is a third pixel position, and the relative position of the light source to the second fixed point is a third light source position. When the first pixel 31 is observed from the first fixed point, the relative position of the first pixel 31 to the first fixed point is a first pixel position, and the relative position of the light source to the first fixed point is a first light source position. When the third pixel position is the same as the first pixel position, and the third light source position is the same as the first light source position, the third pixel 33 emits toward the second fixed point the diffracted light that has the same wavelength and thus the same color as the diffracted light emitted by the first pixel 31 toward the first fixed point.

Figure 14:
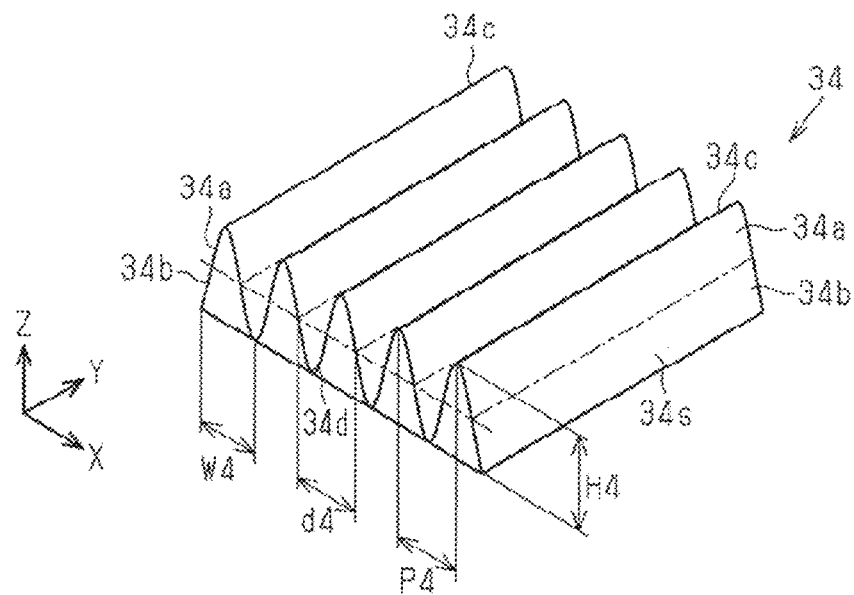
FIG. 14 is a partial perspective view showing a part of the structure of the fourth uneven surface of a fourth pixel.

As shown in FIG. 14, a fourth pixel 34, which is an example of a second arrangement pixel and also an example of a second period pixel, includes a fourth uneven surface 34s forming a part of the uneven surface 11s. The fourth uneven surface 34s includes fourth protrusion surfaces 34a and fourth depression surfaces 34b, which alternate in the X direction. The fourth protrusion surfaces 34a and the fourth depression surfaces 34b extend in the Y direction.

In the same manner as the third protrusion surfaces 33a, each fourth protrusion surface 34a has the shape of a strip extending in the Y direction and tapers toward the fourth top section 34c in the Z direction. In the same manner as the third depression surfaces 33b, each fourth depression surface 34b has the shape of a strip extending in the Y direction and tapers toward the fourth bottom section 34d in the Z direction.

As in the first pixel 31, the fourth protrusion surfaces 34a and the fourth depression surfaces 34b of the fourth pixel 34 are arranged at the period that limits reflection of the incident light on the fourth pixel 34 in the front-view direction of the fourth pixel 34 and allows the fourth pixel 34 to diffract the light incident on the fourth pixel 34 and emit diffracted light in the oblique view direction of the fourth pixel 34.

Each fourth protrusion surface 34a includes a fourth top section 34c, and the fourth top sections 34c are arranged at a fourth pitch P4 in the X direction. In the fourth uneven surface 34s, a fourth protrusion surface 34a and a fourth depression surface 34b that are adjacent to each other in the X direction form a repetition unit, and the length in the X direction of the repetition unit is a fourth period d4. The maximum width in the fourth uneven surface 34s is a fourth maximum width W4, which is equal to the fourth period d4. The fourth period d4 is equal to the second period d2.

In the fourth uneven surface 34s, the distance between the fourth top sections 34c of the fourth protrusion surfaces 34a and the fourth bottom sections 34d of the fourth depression surfaces 34b is a fourth height H4, which is equal to the first height H1.

The fourth protrusion surfaces 34a of the fourth pixel 34 extend in the Y direction, so that the fourth pixel 34 emits diffracted light toward the second fixed point in a similar manner as the third pixel 33. On the other hand, the fourth period d4 of the fourth pixel 34 is equal to the second period d2.

When the fourth pixel 34 is observed from the second fixed point, the relative position of the fourth pixel 34 to the second fixed point is a fourth pixel position, and the relative position of the light source to the second fixed point is a fourth light source position. When the second pixel 32 is observed from the first fixed point, the relative position of the second pixel 32 to the first fixed point is a second pixel position, and the relative position of the light source to the first fixed point is a second light source position. When the fourth pixel position is same as the second pixel position, and the fourth light source position is the same as the second light source position, the fourth pixel 34 emits toward the second fixed point the diffracted light that has same wavelength and thus same color as the diffracted light emitted by the second pixel 32 toward the first fixed point.

[Operation of Display]

Figure 15:
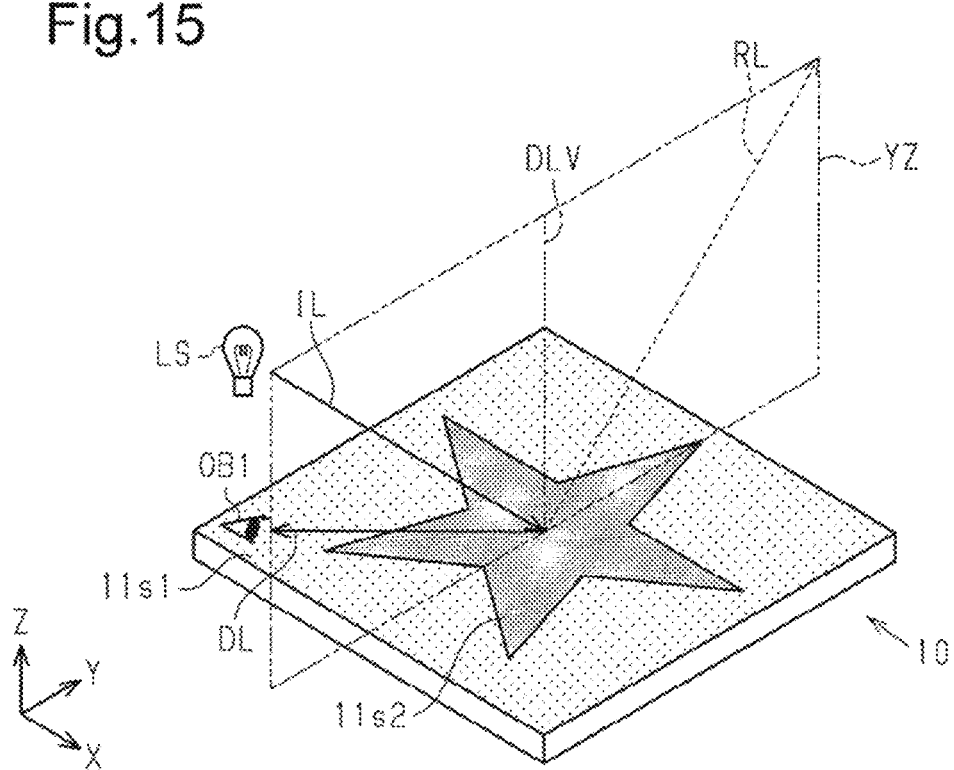
FIG. 15 is a diagram for illustrating the operation of the display when viewed obliquely.
Figure 16:
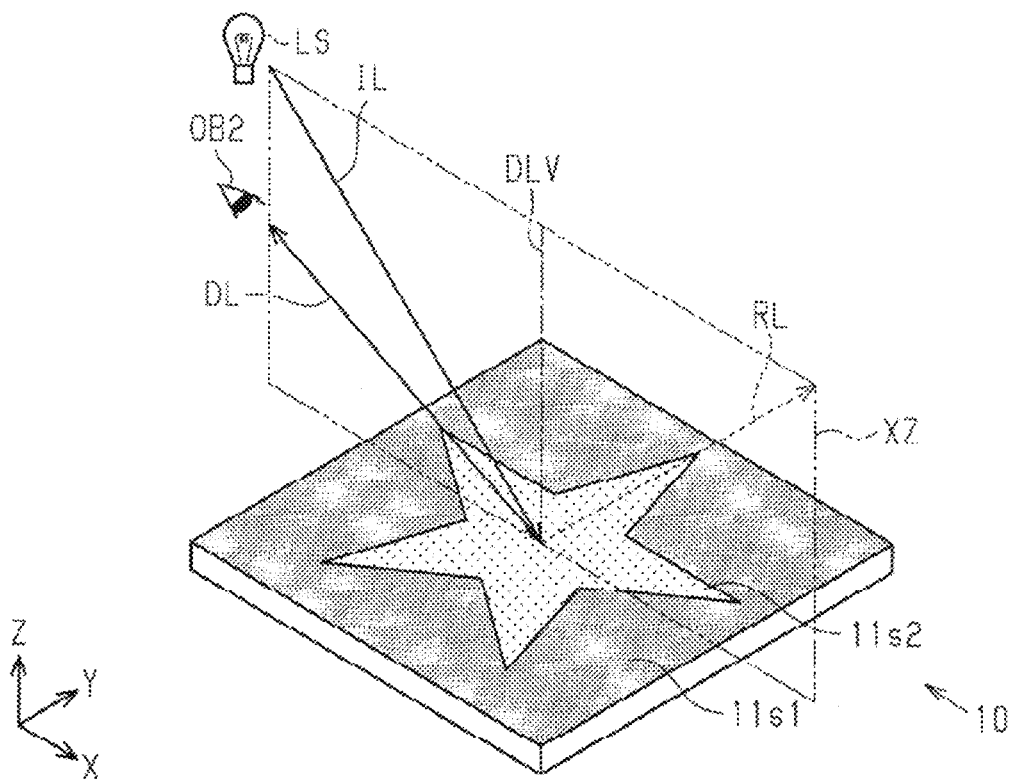
FIG. 16 is a diagram for illustrating the operation of the display when viewed obliquely.
Figure 17:
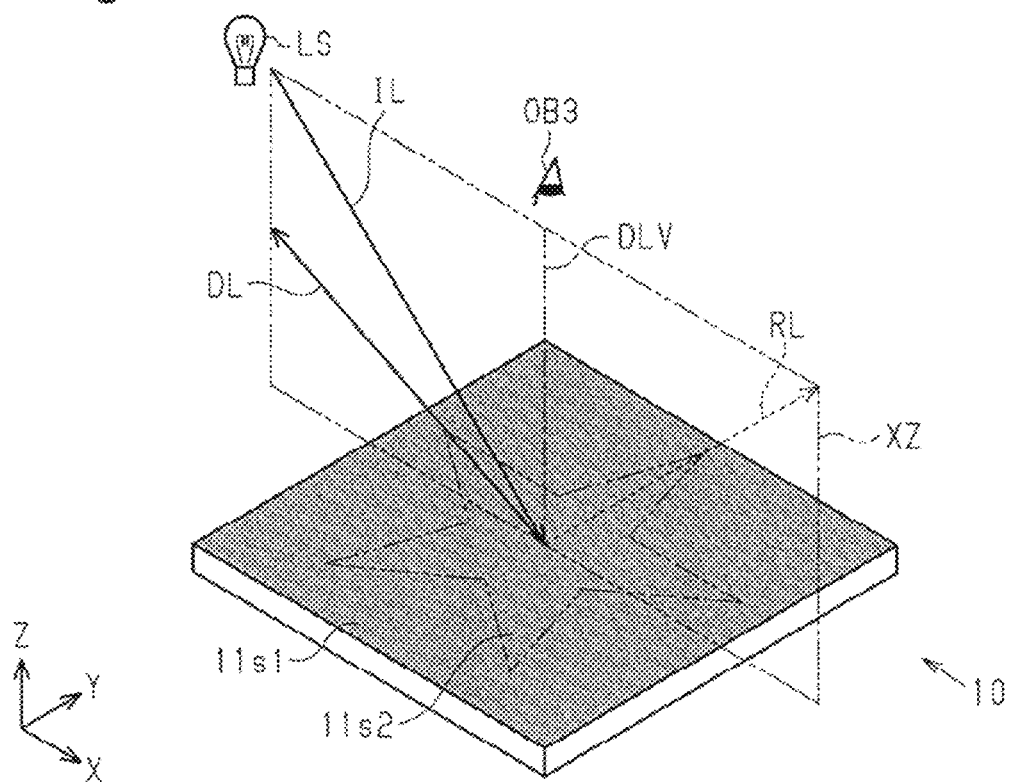
FIG. 17 is a diagram for illustrating the operation of the display when viewed from the front.

Referring to FIGS. 15 to 17, the operation of the display 10 is described. FIG. 15 schematically shows an image formed by the diffracted light emitted by the display 10 toward the first fixed point. FIG. 16 schematically shows an image formed by the diffracted light emitted by the display 10 toward the second fixed point. FIG. 17 schematically shows an image displayed by the display 10 in the front-view direction.

As shown in FIG. 15, a light source LS may emit illumination light IL from a predetermined area in the YZ plane YZ toward the display 10 in an oblique direction, and an observer may view the display 10 from a first fixed point OB1, which is a point in the YZ plane YZ on the side opposite to the emission light RL with respect to the front-view direction DLV of the display 10.

Here, the pixels 30 which emit diffracted light DL toward the first fixed point OB1 is only the first pixels 31 and the second pixels 32.

As described above, the first region 11s1 includes first pixels 31 and second pixels 32, which are the pixels 30 including protrusion surfaces extending in the X direction, and third pixels 33, which are the pixels 30 including protrusion surfaces extending in the Y direction. The ratio in the first region 11s1 between the pixels 30 including protrusion surfaces extending in the X direction and the pixels 30 including protrusion surfaces extending in the Y direction is 3:1.

The second region 11s2 includes first pixels 31, which are the pixels 30 including protrusion surfaces extending in the X direction, and third pixels 33 and fourth pixels 34, which are the pixels 30 including protrusion surfaces extending in the Y direction. The ratio in the second region 11s2 between the pixels 30 including protrusion surfaces extending in the X direction and the pixels 30 including protrusion surfaces extending in the Y direction is 1:3.

That is, the first region 11s1 differs from the second region 11s2 in the ratio of the sum of the areas of the first arrangement pixels to the area of the region and the ratio of the sum of the areas of the second arrangement pixels to the area of the region.

The brightness of the diffracted light DL emitted from the first region 11s1 toward the first fixed point OB1 is therefore higher than the brightness of the diffracted light DL emitted from the second region 11s2 toward the first fixed point OB1.

In addition, as the pixels 30 that emit diffracted light DL toward the first fixed point OB1, the first region 11s1 includes the first pixels 31 and the second pixels 32, while the second region 11s2 includes only the first pixels 31. That is, the first region 11s1 differs from the second region 11s2 in the ratio between the sum of the areas of the first pixels 31 and the sum of the areas of the second pixels 32.

As such, the diffracted light DL emitted from the first region 11s1 toward the first fixed point OB1 includes two types of diffracted light DL of different wavelengths, so that the image displayed by the first region 11s1 is perceived as an image of a first color in which two different colors are mixed.

In contrast, the diffracted light DL emitted from the second region 11s2 toward the first fixed point OB1 has the same wavelength as one of the two types of diffracted light DL emitted from the first region 11s1 toward the first fixed point OB1. As such, the image displayed by the second region 11s2 is perceived as an image of a second color that differs from the color of the image displayed by the first region 11s1.

That is, the uneven surface 11s is configured such that the color of the diffracted light DL emitted from the first region 11s1 toward the first fixed point OB1 differs from the color of the diffracted light DL emitted from the second region 11s2 toward the first fixed point OB1. The color of the diffracted light DL is a second property, and the second property is one of the properties of the diffracted light DL.

The first region 11s1 and the second region 11s2 differ from each other in the brightness and the color of the image displayed toward the first fixed point OB1, so that the image displayed by the first region 11s1 is visually distinguished from the image displayed by the second region 11s2 at the first fixed point OB1. The color of light emitted from the first region 11s1 differs from the color of light emitted from the second region 11s2. This allows for clear distinction between the first region 11s1 and the second region 11s2 as compared with a structure in which the two regions differ from each other only in the brightness of emitted light.

As shown in FIG. 16, the light source LS may emit illumination light IL from a predetermined area in the XZ plane XZ toward the display 10 in an oblique direction, and the observer may view the display 10 from a second fixed point OB2, which is a point in the XZ plane XZ on the side opposite to the emission light RL with respect to the front-view direction DLV of the display 10.

Here, of the pixels 30, only the third pixels 33 and the fourth pixels 34 emit diffracted light DL toward the second fixed point OB2.

As a result, the brightness of the diffracted light DL emitted from the second region 11s2 toward the second fixed point OB2 is higher than the brightness of the diffracted light DL emitted from the first region 11s1 toward the second fixed point OB2.

In addition, as the pixels 30 that emit diffracted light DL toward the second fixed point OB2, the first region 11s1 includes only the third pixels 33, while the second region 11s2 includes the third pixels 33 and the fourth pixels 34. That is, the first region 11s1 differs from the second region 11s2 in the ratio between the sum of the areas of the third pixels 33 and the sum of the areas of the fourth pixels 34.

As such, the diffracted light DL emitted from the second region 11s2 toward the second fixed point OB2 includes two types of diffracted light DL of different wavelengths, so that the image displayed by the second region 11s2 is perceived as an image of a color in which two different colors are mixed. The color of the image displayed by the second region 11s2 is the first color and same as the color of the image displayed by the first region 11s1 when the first region 11s1 is viewed from the first fixed point OB1.

In contrast, the diffracted light DL emitted from the first region 11s1 toward the second fixed point OB2 has the same wavelength as one of the two types of diffracted light DL emitted from the second region 11s2 toward the second fixed point OB2. As such, the image displayed by the first region 11s1 is perceived as an image of a color that differs from the color of the image displayed by the second region 11s2. The color of the image displayed by the first region 11s1 is the second color and the same as the color of the image displayed by the second region 11s2 when the second region 11s2 is viewed from the first fixed point OB1.

The first region 11s1 and the second region 11s2 differ from each other in the brightness and the color of the image displayed toward the second fixed point OB2, so that the image displayed by the first region 11s1 is visually distinguished from the image displayed by the second region 11s2 at the second fixed point OB2.

The display 10 allows the region that emits diffracted light DL of a higher brightness to be switched between the first region 11s1 and the second region 11s2 when the viewpoint of the display 10 is switched between the first fixed point OB1 and the second fixed point OB2. In other words, the display 10 is able to display toward the second fixed point OB2 an image in which the relationship between the brightness of the first region 11s1 and the brightness of the second region 11s2 is inverted from that in the image displayed toward the first fixed point OB1.

Further, the display 10 allows the colors of the diffracted light emitted from the first region 11s1 and the second region 11s2 to be switched between the first color and the second color when the viewpoint of the display 10 is switched between the first fixed point OB1 and the second fixed point OB2.

As shown in FIG. 17, the display 10 displays an image having a reduced lightness, such as an image in black, toward a third fixed point OB3 located in the front-view direction DLV.

The first height H1 of the first uneven surface 31s, the second height H2 of the second uneven surface 32s, the third height H3 of the third uneven surface 33s, and the fourth height H4 of the fourth uneven surface 34s are all equal. This limits variance in the lightness of the image displayed by the pixels 30 in the front-view direction DLV, which would otherwise occur if the heights of the uneven surfaces of the pixels 30 vary.

As described above, in the first region 11s1, the ratio between the pixels 30 whose period d of the uneven surface is the first period d1 or the third period d3 and the pixels 30 whose period d of the uneven surface is the second period d2 is 3:1.

In the second region 11s2, the ratio between the pixels 30 whose period d of the uneven surface is the first period d1 or the third period d3 and the pixels 30 whose period d of the uneven surface is the fourth period d4 is 3:1.

Each pixel 30 is so small that the pixels 30 are indistinguishable from one another when the display 10 is observed with the naked eye. Thus, in each of the first region 11s1 and the second region 11s2, the average of the lightnesses of the pixels 30 in each region is perceived as the lightness of the region.

In addition, the first region 11s1 and the second region 11s2 have the same ratio between the pixels 30 whose period d is the first period d1 or the third period d3 and the pixels 30 whose period d is the second period d2 or the fourth period d4. Consequently, the lightness of the image displayed by the first region 11s1 is equal to the lightness of the image displayed by the second region 11s2.

This structure allows the image displayed by the display 10 to be perceived as one image when the display 10 is viewed from the third fixed point OB3. As such, when the display 10 is viewed along the front-view direction DLV, the image formed by the first region 11s1 and the second region 11s2 of the display 10 is hidden from the observer.

Figure 18:
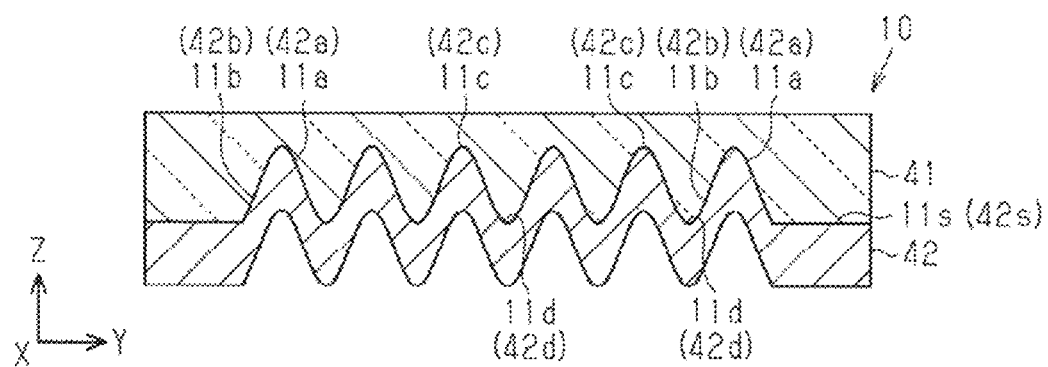
FIG. 18 is a cross-sectional view showing the cross-sectional structure of an example of a display.
Figure 19:
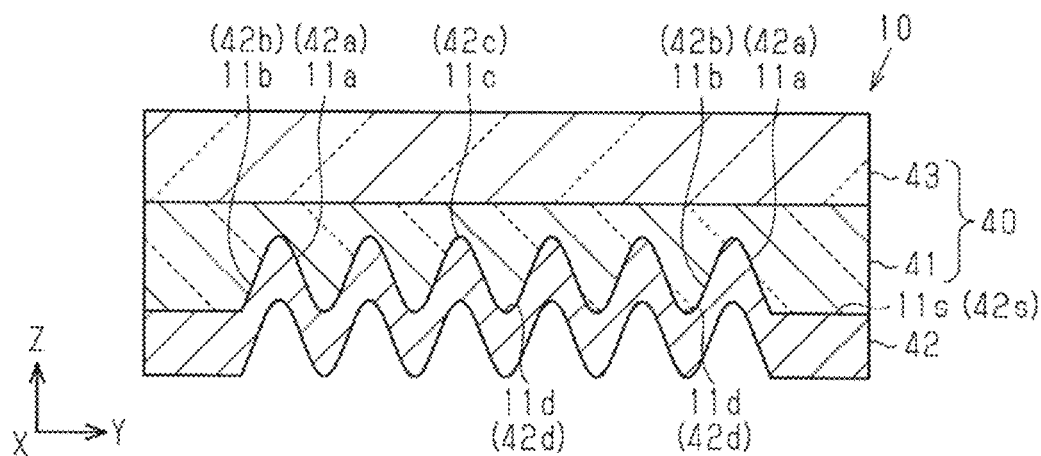
FIG. 19 is a cross-sectional view showing the cross-sectional structure of an example of a display.

Referring to FIGS. 18 and 19, a structure is now described that may be used as the displays 10 described above, namely, the displays 10 of the first embodiment and the second embodiment. In FIGS. 18 and 19, the same reference numerals are given to those components that are the same as the corresponding components of the first embodiment for the purpose of illustration.

As shown in FIG. 18, an example of the display 10 includes an uneven structure layer 41, which is an example of an uneven structure, and a metal layer 42, which covers an uneven surface 11s of the uneven structure layer 41. That is, the laminate of the uneven structure layer 41 and the metal layer 42 forms an example of an uneven structure. Of the surfaces of the uneven structure layer 41 of the display 10, the surface opposite to the surface in contact with the metal layer 42 is a flat surface, which is the front surface of the display 10. The surface of the metal layer 42 that is opposite to the surface in contact with the uneven structure layer 41 is the reverse surface of the display 10.

In the thus configured display 10, the surface of the metal layer 42 that is in contact with the uneven surface 11s, which is an example of a transmission side uneven surface, is also an example of an uneven surface 42s that serves as a light incident surface. In the uneven surface 42s of the metal layer 42, the sections in contact with the protrusion surfaces 11a of the uneven structure layer 41 are protrusion surfaces 42a of the metal layer 42, and the sections in contact with the depression surfaces 11b of the uneven structure layer 41 are depression surfaces 42b of the metal layer 42. In the uneven surface 42s of the metal layer 42, the sections in contact with the top sections 11c of the uneven structure layer 41 are top sections 42c of the metal layer 42, and the sections in contact with the bottom sections 11d of the uneven structure layer 41 are bottom sections 42d of the metal layer 42.

The interface between the uneven structure layer 41 and the metal layer 42, that is, both of the uneven structure layer 41 and the metal layer 42, includes the uneven structures in which protrusion surfaces and depression surfaces are arranged at a period that limits reflection of light. Accordingly, when light is incident on the front side of the display 10, the light is unlikely to be reflected at the interface, so that the light is transmitted to the metal layer 42. The light entering the metal layer 42 is absorbed by the metal layer 42, that is, converted into thermal energy within the metal layer 42.

Further, the interface between the uneven structure layer 41 and the metal layer 42, that is, both of the uneven structure layer 41 and the metal layer 42, includes the uneven structures in which the protrusion surfaces 42a and the depression surfaces 42b are arranged at a period that emits diffracted light in a direction oblique to the display 10. In addition, the uneven surface 11s of the uneven structure layer 41 is in contact with the metal layer 42. This increases the light reflectance of the uneven surface 11s, facilitating emission of diffracted light from the uneven surface 11s.

When the display 10 includes the uneven structure layer 41 and the metal layer 42, the uneven surface 11s of the uneven structure layer 41 is not exposed to the outside of the display 10, reducing damage to the uneven surface 11s as compared with a structure without the metal layer 42. This allows the display 10 to display an image with higher visibility.

The uneven structure layer 41 is a light transmitting layer and may be made of any transparent material. For example, the uneven structure layer 41 is formed by a step of applying resin on a planar member to form a coat, and a step of curing the resin forming the coat while pressing the coat with a stamper. Alternatively, the uneven structure layer 41 may be formed by a step of applying resin on a plate with depressions for shaping the uneven structure layer 41, and a step of curing the applied resin. The uneven structure layer 41 may be formed of thermoplastic resin, thermosetting resin, or photosetting resin, for example.

The metal layer 42 may be made of aluminum, silver, gold, and alloys of these metals. The metal layer 42 may be formed to cover the uneven surface 11s by vapor-phase deposition, such as vacuum deposition or sputtering. The metal layer 42 has a property of absorbing the light incident on the uneven structure.

When forming the display 10, the uneven structure layer 41 is first formed, and then the metal layer 42 is formed so as to cover the uneven surface 11s of the uneven structure layer 41, for example.

Alternatively, the following method may be used to form the display 10 when the metal layer 42 includes an uneven surface, which serves as a surface with protrusions for shaping the uneven structure layer 41, and a flat surface on the opposite side of the uneven surface. That is, the display 10 may be manufactured by forming a metal layer 42 by physically or chemically etching a metal film formed by the vapor-phase deposition described above and by applying resin for forming the uneven structure layer 41 onto the uneven surface 42s of the metal layer 42.

Of the surfaces of the uneven structure layer 41 of the display 10, the surface opposite to the surface in contact with the metal layer 42 may be the reverse surface of the display 10, and the surface of the metal layer 42 opposite to the surface in contact with the uneven structure layer 41 may be the front surface of the display 10. In this case, the uneven surface that serves as the light incident surface of the display 10 is the surface of the metal layer 42 that is opposite to the surface in contact with the uneven structure layer 41, and the metal layer 42 and the uneven structure layer 41 form an example of an uneven structure.

That is, the display 10 includes the uneven structure that includes the uneven structure layer 41 and the metal layer 42. The uneven structure layer 41 includes the uneven surface 11s, which is an example of a transmission side uneven surface. The metal layer 42 covers the uneven surface 11s and includes the surface in contact with the uneven surface 11s and the surface opposite to the surface in contact with the uneven surface 11s. One of the two surfaces is the uneven surface serving as the light incident surface.

Each protrusion surface has the shape of a strip extending in the extension direction perpendicular to the arrangement direction, and each protrusion surface tapers toward the top section in the thickness direction of the uneven structure. Each depression surface has the shape of a strip extending in the extension direction, and each depression surface tapers toward the bottom section in the thickness direction of the uneven structure. In the uneven surface, the protrusion surfaces and the depression surfaces are arranged at a period that limits reflection of the incident light on the uneven surface in the front-view direction of the uneven surface and diffracts the light incident on the uneven surface to emit diffracted light in the oblique view direction of the uneven surface.

As shown in FIG. 19, an example of a display 10 is a laminate of a light transmitting layer 40 and a metal layer 42. The surface of the light transmitting layer 40 that is opposite to the surface in contact with the metal layer 42 is the front surface of the display 10, and the surface of the metal layer 42 that is opposite to the light transmitting layer 40 is the reverse surface of the display 10.

The light transmitting layer 40 is a laminate of a support layer 43 and an uneven structure layer 41, and the uneven structure layer 41 is sandwiched between the support layer 43 and the metal layer 42. The surface of the uneven structure layer 41 in contact with the metal layer 42 is an uneven surface 11s that serves as a light incident surface.

That is, the laminate of the uneven structure layer 41 and the metal layer 42 is an example of an uneven structure. In the same manner as the display 10 described referring to FIG. 18, the surface of the metal layer 42 in contact with the uneven surface 11s is also an example of an uneven surface 42s that serves as a light incident surface. In the uneven surface 42s of the metal layer 42, the sections in contact with the protrusion surfaces 11a of the uneven structure layer 41 are protrusion surfaces 42a of the metal layer 42, and the sections in contact with the depression surfaces 11b of the uneven structure layer 41 are depression surfaces 42b of the metal layer 42. In the uneven surface 42s of the metal layer 42, the sections in contact with the top sections 11c of the uneven structure layer 41 are top sections 42c of the metal layer 42, and the sections in contact with the bottom sections 11d of the uneven structure layer 41 are bottom sections 42d of the metal layer 42.

The light transmitting layer 40 may have a multilayer structure of three or more layers including the support layer 43, the uneven structure layer 41, and one or more additional layers. In this case, the additional layer may be located between the support layer 43 and the uneven structure layer 41, or on the surface of the support layer 43 opposite to the uneven structure layer 41.

The support layer 43 is a film or a sheet that can be handled independently. The support layer 43 may be made of a light transmitting resin, such as polycarbonate or polyester.

For example, the uneven structure layer 41 is formed by a step of applying resin on the support layer 43 to form a coat, and a step of curing the resin forming the coat while pressing the coat with a stamper. The uneven structure layer 41 may be made of thermoplastic resin, thermosetting resin, or photosetting resin, for example, in the same manner as the uneven structure layer 41 described above referring to FIG. 18.

The metal layer 42 is formed on the entire uneven surface 11s of the uneven structure layer 41. However, the metal layer 42 may be formed on a part of the uneven surface 11s of the uneven structure layer 41. This also applies to the structure described above referring to FIG. 18.

The metal layer 42 may be made of one of the metals and alloys described above. The uneven surface 11s of the uneven structure layer 41 is in contact with the metal layer 42. This increases the light reflectance of the uneven surface 11s, facilitating emission of diffracted light from the uneven surface 11s.

The metal layer 42 may be formed by vapor-phase deposition, such as vacuum deposition or sputtering. When the metal layer 42 is formed on a part of the uneven surface 11s, the metal layer 42 is formed by the method below.

That is, the metal layer 42 is formed by a step of forming metal film on the entire uneven surface 11s of the uneven structure layer 41 using vapor-phase deposition and by a step of patterning the film. The step of patterning the film may use a method of dissolving a part of the film with an alkaline or acidic chemical agent, or a method of peeling off a part of the film using an adhesive that adheres to the film with an adhesion force greater than the cohesion between the film and the uneven structure layer 41. The metal layer 42 that covers a part of the uneven surface 11s may also be formed by vapor-phase deposition using a mask.

The surface of the light transmitting layer 40 opposite to the surface in contact with the metal layer 42 may be the reverse surface, and the surface of the metal layer 42 opposite to the surface in contact with the uneven structure layer 41 may be the front surface. In this case, the uneven surface that serves as the light incident surface of the display 10 is the surface of the metal layer 42 that is opposite to the surface in contact with the uneven structure layer 41, and the metal layer 42 and the uneven structure layer 41 form an example of an uneven structure.

In addition to the light transmitting layer 40 and the metal layer 42, the display 10 may further include other layers such as an adhesion layer, a cohesion layer, and a plastic layer.

When the display 10 includes at least one of an adhesion layer and a cohesion layer, the adhesion layer and the cohesion layer may be the layer that covers the surface of the metal layer 42 opposite to the uneven structure layer 41 and forms the reverse surface of the display 10. Typically, in the display 10 including the light transmitting layer 40 and the metal layer 42, the shape of the reverse surface formed by the metal layer 42 is substantially the same as the shape of the interface between the uneven structure layer 41 and the metal layer 42. When the reverse surface of the display 10 is at least one of an adhesion layer and a cohesion layer, the surface of the metal layer 42 is not exposed to the outside of the display 10.

The shape of the reverse surface of the display 10, which is a surface of at least one of the adhesion layer and the cohesion layer, is smoother than the shape of the surface of the metal layer 42 and therefore differs from the shape of the surface of the metal layer 42. This increases the difficulty in replicating the display 10 for counterfeiting.

In the display 10, when the surface of the light transmitting layer 40 that is opposite to the metal layer 42 is the reverse surface and the surface of the metal layer 42 that is opposite to the light transmitting layer 40 is the front surface, at least one of an adhesion layer and a cohesion layer may be formed on the surface of the light transmitting layer 40 opposite to the surface in contact with the metal layer 42. Further, when the surface of the metal layer 42 opposite to the light transmitting layer 40 is the front surface and also an uneven surface serving as an incident surface, a light blocking layer, in addition to or in place of the light transmitting layer 40, may be located on the reverse surface of the metal layer 42 of the display 10.

The display 10 may include a plastic layer that is positioned, for example, to form the front surface of the display 10 on the front side of the laminate of the light transmitting layer 40 and the metal layer 42. For example, when the metal layer 42 is located frontward of the light transmitting layer 40, the plastic layer covers and protects the metal layer 42 from damage. In addition, the plastic layer covering the metal layer 42 increases the difficulty in replicating the metal layer 42 for counterfeiting.

Examples of the plastic layer include a hard coating layer for limiting scratching on the front surface of the display 10, an antifouling layer for preventing contamination on the display 10, an anti-reflection layer for preventing reflection of light on the front surface of the display 10, and an antistatic layer for preventing a static electric charge on the display 10.

The display 10 may further include a print layer, which is located on the side of the metal layer 42 that is closer to the light transmitting layer 40. That is, the print layer may be located on the side of the support layer 43 opposite to the surface in contact with the uneven structure layer 41, located between the support layer 43 and the uneven structure layer 41, or located between the uneven structure layer 41 and the metal layer 42.

When the display 10 includes a print layer, the print layer allows the display 10 to display additional information, increasing the complexity of the image displayed by the display 10. The print layer easily displays additional information of the display 10, as compared with a structure in which the uneven surface displays additional information of the display 10.

[Method for Manufacturing Display]

Figure 20:
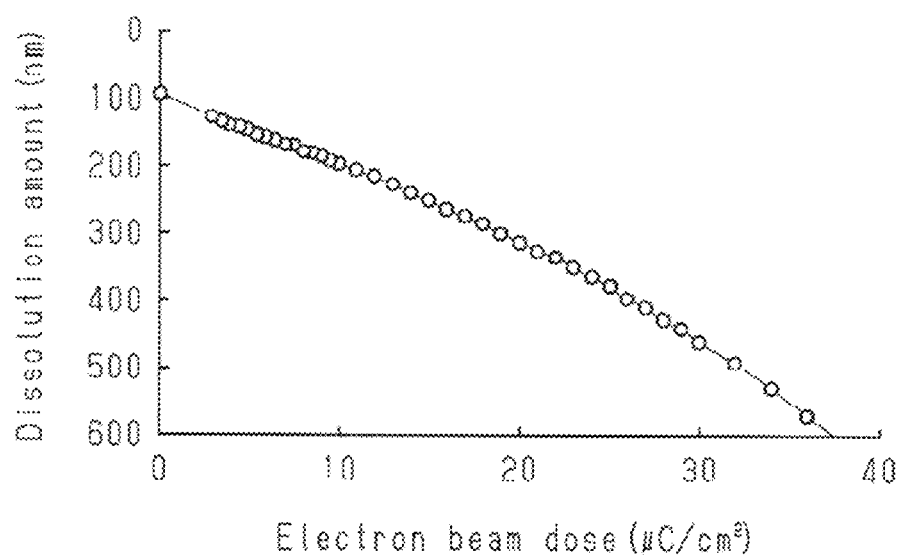
FIG. 20 is a graph showing the relationship between the dose of electron beams applied to polymethyl acrylate and the dissolution amount of polymethyl acrylate.
Figure 21:
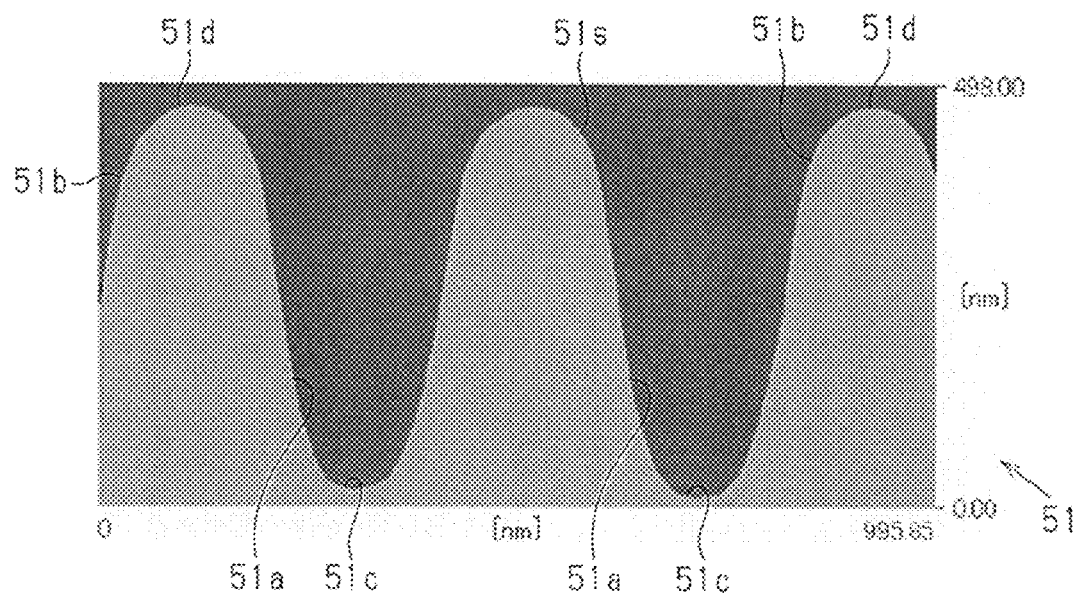
FIG. 21 is a partial cross-sectional view showing a part of the cross-sectional structure of an original plate formed by a first method and measured using an atomic force microscope.
Figure 22:
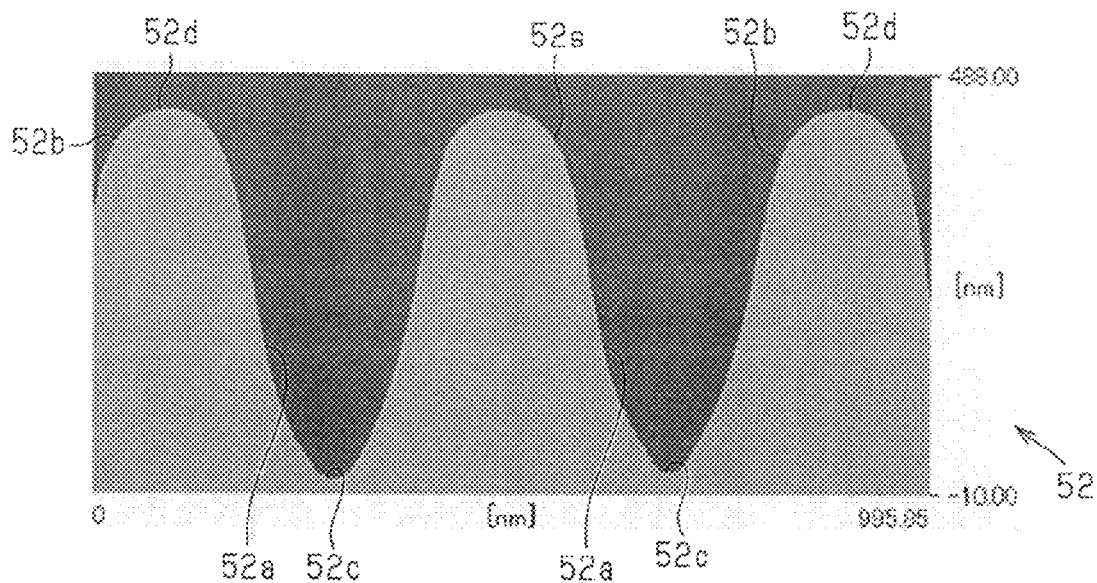
FIG. 22 is a partial cross-sectional view showing a part of the cross-sectional structure of an original plate formed by a second method and measured using an atomic force microscope.

Referring to FIGS. 20 to 22, a method for manufacturing the display 10 is described. In the method for manufacturing the display 10, a method for manufacturing an original plate for forming the uneven surface 11s of the display 10 is described.

As examples of a method for manufacturing an original plate, two methods are described below that form uneven surfaces 11s in which the distance between the top sections and the bottom sections in the uneven surfaces 11s is 450 nm and the pitch of the top sections is 400 nm. To manufacture an original plate, a plastic layer is prepared that is made of polymethyl acrylate, which is a positive resist, and the plastic layer is irradiated with electron beams. In the plastic layer made of a positive resist, the dissolution amount in the section irradiated with electron beams is greater than the dissolution amount in the section that is not irradiated with electron beams. Accordingly, after the plastic layer is developed, the section of the plastic layer that is irradiated with electron beams is depressed deeper than the section that is not irradiated with electron beams.

FIG. 20 shows the relationship between the dose of electron beam ($\mu C/cm^2$) applied to polymethyl acrylate, which is the material for forming the original plate, and the dissolution amount of polymethyl acrylate. The weight-average molecular weight of polymethyl acrylate is 495,000, and the dissolution amount of polymethyl acrylate is the amount measured after immersing the irradiated polymethyl acrylate in 4-methyl-2-pentanone, which is a developing solution, for 12 minutes.

As shown in FIG. 20, when polymethyl acrylate is not irradiated with electron beams, that is, when the dose of electron beam is 0 $\mu C/cm^2$, the dissolution amount of polymethyl acrylate is 100 nm.

Thus, in order to set the distance between the top sections and the bottom sections to 450 nm, the dose of electron beam is set to the value that allows the dissolution amount of the plastic layer in the thickness direction to be 550 nm, namely, about 35 $\mu C/cm^2$. The plastic layer has an irradiation surface, which is one surface. Electron beams are directed to the irradiation surface of the plastic layer.

In the first method, the irradiation surface of the plastic layer is partitioned into irradiation sections and non-irradiation sections that alternate in a specific direction. Each irradiation section has a width of 100 nm, and each non-irradiation section has a width of 300 nm.

When the irradiated plastic layer is immersed and developed in a developing solution, the polymethyl acrylate forming the irradiation surface and its vicinity in the plastic layer is exposed to the developing solution from the beginning of the development. Thus, in the irradiation surface, each irradiation section and two regions that are located on opposite sides of the irradiation section in the specific direction are dissolved. The two regions each have a width of 100 nm. As a result, the sections in the irradiation surface of the plastic layer that are dissolved each have a width of about 300 nm.

In the two regions on opposite sides of the irradiation section in the specific direction, the parts that are farther from the irradiation surface in the thickness direction of the plastic layer are exposed to the developing solution for a shorter time. The sections of the plastic layer to be dissolved include deepest parts, which are farthest from the irradiation surface in the thickness direction of the plastic layer. The deepest parts are exposed to the developing solution only for a very short time just before the end of the development of the plastic layer. Therefore, in each deepest part, the width in the specific direction of the area in which polymethyl acrylate is dissolved is about 100 nm, which is substantially equal to the width in the specific direction of each irradiation section.

FIG. 21 shows a part of the cross-sectional structure of an original plate that is formed by the first method and measured using an atomic force microscope.

The measurement conditions of the atomic force microscope include a spring constant of the cantilever of 40.000 N/m, a torsion spring constant of 100.0 N/m, a resonance frequency of 300.00 kHz, a length of the lever of 140.0 μm, and a height of the probe of 10.00 μm. The atomic force microscope uses the beam-deflection method. The oscillation voltage is 0.018 V, the resonance frequency is 268.215 kHz, and the measurement frequency is 268.010 kHz. The constants of oscillation in the measurement include an oscillation dumping ratio of −0.279, a Q-curve gain of 1.50, and a Q factor of 463.608.

As shown in FIG. 21, an original plate 51 includes an uneven surface 51s. The uneven surface 51s has protrusion surfaces 51a, which correspond to the protrusion surfaces 11a of the uneven structure layer 41 shown in FIG. 18, and depression surfaces 51b, which correspond to the depression surfaces 11b of the uneven structure layer 41. In the uneven surface 51s, the protrusion surfaces 51a and the depression surfaces 51b alternate in one direction. As shown in FIG. 21, the measurement result obtained using the atomic force microscope shows that the uneven surface 51s substantially has the shape described above, that is, the pitch of the top sections 51c is about 400 nm, and the distance between the top sections 51c and the bottom sections 51d is about 450 nm.

The second method differs from the first method in that the second method irradiates each irradiation section twice with electron beams. The second method also differs in the dose of electron beam per irradiation on each irradiation section. That is, in the first electron beam irradiation, the entire irradiation section is irradiated with electron beams of a dose of 20 $\mu C/cm^2$.

Then, for the second electron beam irradiation, a partial irradiation section is first set within each irradiation section. Each partial irradiation section has a width of 20 nm in a specific direction and extends in the thickness direction of the plastic layer. The center of the irradiation section and the center of the partial irradiation section in the specific direction are aligned. In the second electron beam irradiation, the partial irradiation section is irradiated with electron beams of a dose of 20 $\mu C/cm^2$.

FIG. 22 shows a part of the cross-sectional structure of an original plate that is formed by the second method and measured using an atomic force microscope.

As shown in FIG. 22, an original plate 52 includes an uneven surface 52s. The uneven surface 52s has protrusion surfaces 52a, which correspond to the protrusion surfaces 11a of the uneven structure layer 41 shown in FIG. 18, and depression surfaces 52b, which correspond to the depression surfaces 11b of the uneven structure layer 41. In the uneven surface 52s, the protrusion surfaces 52a and the depression surfaces 52b alternate in a specific direction. In the same manner as the original plate 51 formed by the first method, the top sections 52c are arranged at a pitch of 400 nm, and the distance between the top sections 52c and the bottom sections 52d is about 450 nm in the uneven surface 52s. On the other hand, in the original plate 52 formed by the second method, the section where the irradiation section and the partial irradiation section overlap receives a greater dose of electron beam than the other section in the irradiation section.

In accordance with the width in the specific direction of the partial irradiation section, the width in the specific direction of the top section 52c of each protrusion surface 52a is about 20 nm.

As described above, in the uneven surface, the smaller the areas of the flat surfaces forming the bottom sections and the top sections, the lower the reflectance of light on the top sections and the bottom sections becomes. Thus, the display 10 formed using the original plate 52 manufactured by the second method displays an image having a low lightness in the front-view direction of the display 10, as compared with the original plate 51 manufactured by the first method.

The uneven surface of the original plate manufactured by the first or second method may be subjected to nickel electroforming to form a stamper to which the uneven surface is transferred. Then, a plastic uneven structure may be formed by transferring the uneven surface of the stamper to the plastic layer. In this case, since the protrusion surfaces and the depression surfaces forming the uneven surface of the stamper are tapered, the uneven structure is easily removed from the stamper, increasing the productivity of the display 10.

The second method allows the top sections to have smaller areas than those formed by the first method, facilitating entry of the uneven surface of the stamper, which is formed by transferring the original plate, into the plastic layer. This enhances the shaping of the uneven structure layer. The enhanced shaping increases the shaping speed, thereby improving the productivity of the display. Moreover, the enhanced shaping allows for an increase in the aspect ratio of the uneven surface. Thus, the second method is effective also in reducing the lightness of the image displayed in the front-view direction of the display 10.

The material for forming the original plate is not limited to polymethyl acrylate, and may be an acrylic resin other than polymethyl acrylate, or a resist material such as novolac resin and hydroxystyrene. Further, the developing solution is not limited to 4-methyl-2-pentanone and may be alkyl acetates, ketones, aromatic compounds, or mixtures thereof. The aromatic compounds may be xylene, anisole, and chlorobenzene, for example.

When the original plate is made of a resist material such as novolak resin and polyhydroxystyrene, the developing solution may be an ammonium salt, such as tetramethylammonium hydroxide, and a hydroxide, such as potassium hydroxide.

The development method for the plastic layer, the development time for the plastic layer, and the width of the irradiation sections irradiated with electron beams may be changed freely as long as an original plate having an uneven surface may be formed. The second method irradiates the partial irradiation sections with electron beams after irradiating the irradiation sections with electron beams. However, the partial irradiation sections may be irradiated with electron beams before the irradiation sections are irradiated with electron beams. The second method irradiates each irradiation section twice with electron beams. However, each irradiation section may be irradiated three times or more with electron beams. In this case, a plurality of partial irradiation sections are set in each irradiation section, and the partial irradiation sections are set such that their centers in the width direction are aligned with the center in the width direction of the irradiation section. In addition, the partial irradiation sections are set to have different widths in one direction.

[Structure of Article]

The display 10 described above may be used with an article to prevent counterfeiting of the article. The uneven surface 11s of the display 10 allows the display 10 to limit reflection of light in the front-view direction of the display 10 and to emit diffracted light in the oblique view direction of the display 10.

As such, the display 10 is difficult to counterfeit by imitating the shape of the uneven surface 11s of the display 10. Consequently, the display 10 increases the difficulty of counterfeiting the article to which the display 10 is affixed.

By verifying whether the display 10 is able to limit reflection of light in the front-view direction of the display 10 and to emit diffracted light in the oblique view direction of the display 10, the display 10 and thus the article are authenticated.

Figure 23:
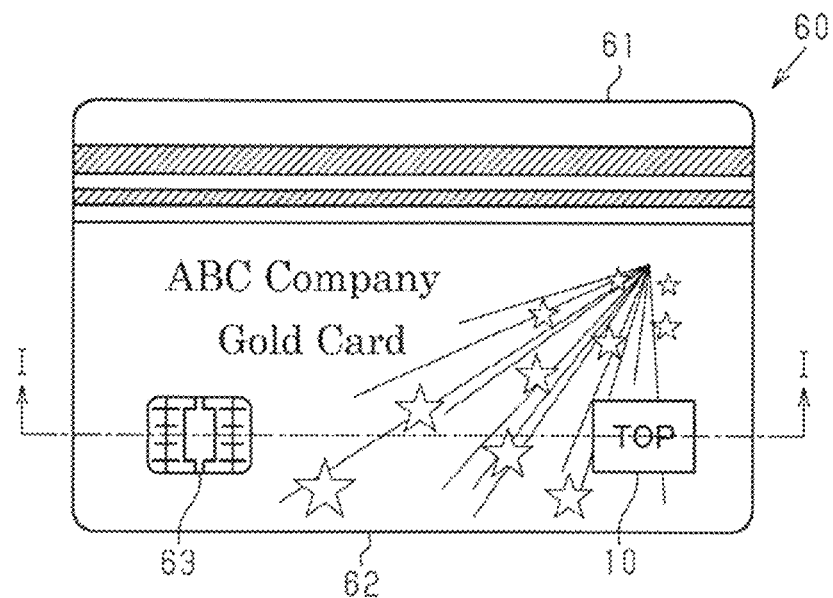
FIG. 23 is a plan view showing the planar structure of an example of an article having a display.
Figure 24:
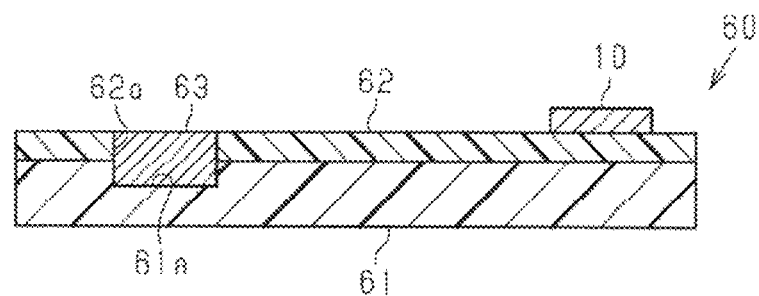
FIG. 24 is a cross-sectional view showing the cross-sectional structure of the article taken along line I-I in FIG. 23.

Referring to FIGS. 23 and 24, the structure of an IC card is now described as an example of an article including a display 10.

As shown in FIG. 23, an integrated circuit (IC) card 60 includes a planar base 61, which may be made of plastic, a print layer 62 on which an image is printed, an IC chip 63, and a display 10.

As shown in FIG. 24, the print layer 62 is formed on one surface of the base 61. The display 10 described above is fixed using an adhesive layer, for example, to the surface of the print layer 62 that is opposite to the surface in contact with the base 61. The display 10 is prepared as transfer foil or a sticker having an adhesive layer and affixed to the print layer 62, for example.

The base 61 includes a depression 61a, which extends from a part of the surface in contact with the print layer 62 toward the surface opposite to the surface in contact with the print layer 62. The print layer 62 includes a through hole 62a in the position aligned with the depression 61a as viewed in the thickness direction of the IC card 60. The IC chip 63 is fitted into the depression 61a and the through hole 62a. The IC chip 63 has an obverse surface, which is surrounded by the print layer 62 and includes a plurality of electrodes. Information is written into and read from the IC chip 63 through the electrodes.

The IC card 60 is difficult to counterfeit since the IC card 60 has the display 10 that is difficult to counterfeit. Moreover, the IC card 60 has the IC chip 63 and the print layer 62 in addition to the display 10. The IC chip 63 and the print layer 62 help prevent counterfeiting.

The display of the second embodiment has the following advantages in addition to the advantage of the display of the first embodiment.

(2) To an observer who views the display 10 from a fixed point on the observation side, the display 10 displays an image formed by the difference between the brightness of the diffracted light emitted from the first region 11s1 and the brightness of the diffracted light emitted from the second region 11s2. Thus, as compared with a structure in which one type of diffracted light is emitted from the entire uneven surface 11s, the image displayed in the oblique view direction of the uneven surface 11s, which is one of the images displayed by the uneven surface 11s, is more complex.

(3) The difference between the brightness of the first region 11s1 and the brightness of the second region 11s2 allows the display 10 to form an image displayed toward the first fixed point OB1 and an image displayed toward the second fixed point OB2. Further, the display 10 is able to display toward the second fixed point OB2 an image in which the relationship between the brightness of the first region 11s1 and the brightness of the second region 11s2 is inverted from that in the image displayed toward the first fixed point OB1.

(4) In the image displayed by the display 10 toward one fixed point, the color of the first region 11s1 differs from the color of the second region 11s2. This allows for clear distinction between the first region 11s1 and the second region 11s2 as compared with a structure in which the two regions differ from each other only in brightness.

(5) The image displayed by the display 10 in the front-view direction of the display 10 is visually perceived as one image. Thus, the image formed by the difference between a property of the diffracted light from the first region 11s1 and a property of the diffracted light from the second region 11s2 is hidden from the observer in the front-view direction of the display 10.

[Modifications of Second Embodiment]

The above-described second embodiment may be modified as follows.

The second arrangement direction may intersect with the first arrangement direction so as to form an angle other than a right angle. Such a structure still allows the first arrangement pixel, in which the protrusion surfaces and the depression surfaces alternate in the first arrangement direction, and the second arrangement pixel, in which the protrusion surfaces and the depression surfaces alternate in the second arrangement direction, to emit diffracted light in different directions.

The pixels 30 forming the uneven surface 11s may include the first pixels 31, the second pixels 32, the third pixels 33, and the fourth pixels 34. In addition, the uneven surface 11s does not have to be partitioned into the first region 11s1 and the second region 11s2. Such a display is still able to emit light of a mixed color of two colors toward each of the first fixed point and the second fixed point.

The display may be configured such that only the first region 11s1 emits diffracted light toward the first fixed point OB1 and only the second region 11s2 emits diffracted light toward the second fixed point OB2. In such a structure, the difference between the brightnesses of the diffracted light allows the image displayed by the first region 11s1 and the image displayed by the second region 11s2 to be visually distinguished from each other when the display 10 is viewed from the first fixed point OB1 and also when viewed from the second fixed point OB2.

That is, the first region 11s1 may consist of the pixels 30 that include at least either of first pixels 31 and second pixels 32, while the second region 11s2 may consist of the pixels 30 that include at least either of third pixels 33 and fourth pixels 34.

The brightness of the diffracted light emitted from the first region 11s1 toward the first fixed point OB1 may be higher than the brightness of the diffracted light emitted from the second region 11s2 toward the first fixed point OB1, and the brightness of the diffracted light emitted from the first region 11s1 toward the second fixed point OB2 may be higher than the brightness of the diffracted light emitted from the second region 11s2 toward the second fixed point OB2. Such a structure still allows the image displayed by the first region 11s1 and the image displayed by the second region 11s2 to be visually distinguished from each other when the display 10 is viewed from the first fixed point OB1 and also when viewed from the second fixed point OB2.

For example, the ratio of the sum of the areas of the third pixels 33 and the areas of the fourth pixels 34 to the area of the first region 11s1 may be greater than the ratio of the sum of the areas of the third pixels 33 and the areas of the fourth pixels 34 to the area of the second region 11s2.

The brightness of the diffracted light emitted from the first region 11s1 toward a fixing point may be lower than the brightness of the diffracted light emitted from the second region 11s2 toward the fixing point.

That is, the display may have any structure as long as: of the first arrangement pixels and second arrangement pixels, the first region 11s1 includes at least the first arrangement pixels, while the second region 11s2 includes at least the second arrangement pixels; the ratio of the sum of the areas of the first arrangement pixels to the area of the first region 11s1 differs from the ratio of the sum of the areas of the first arrangement pixels to the area of the second region 11s2; and the ratio of the sum of the areas of the second arrangement pixels to the area of the first region 11s1 differs from the ratio of the sum of the areas of the second arrangement pixels to the area of the second region 11s2. Such a structure has the following advantage.

(6) In each of the image displayed toward the first fixed point OB1 and the image displayed toward the second fixed point OB2 by the display 10, the brightness of the image displayed by the first region 11s1 differs from the brightness of the image displayed by the second region 11s2. The difference between the two images in brightness allows the display 10 to display an image in which the section displayed by the first region 11s1 is visually distinguished from the section displayed by the second region 11s2.

As long as the pixels 30 forming the uneven surface 11s include the first arrangement pixels and the second arrangement pixels, the uneven surface 11s does not have to be partitioned into the first region 11s1 and the second region 11s2.

Such a structure still has the following advantage.

(7) The uneven surface 11s includes the first arrangement pixels, which emit diffracted light toward the first fixed point OB1, and the second arrangement pixels, which emit diffracted light toward the second fixed point OB2. This allows the display 10 to display toward the first fixed point OB1 an image formed by the diffracted light emitted from the pixels that differ from the pixels that emit the diffracted light forming the image displayed toward the second fixed point OB2.

The color of the diffracted light emitted from the first region 11s1 toward a fixed point differs from the color of the diffracted light emitted from the second region 11s2 toward the fixed point, but the brightness of the diffracted light emitted from the first region 11s1 toward the fixed point may be equal to the brightness of the diffracted light emitted from the second region 11s2 toward the fixed point. Such a structure still allows the image displayed by the first region 11s1 and the image displayed by the second region 11s2 to be visually distinguished from each other.

For example, the first region 11s1 may include one of a set of first pixels 31 and a set of second pixels 32 and one of a set of third pixels 33 and a set of fourth pixels 34 in a ratio of 1:1, and the second region 11s2 may include the other of a set of first pixels 31 and a set of second pixels 32 and the other of a set of third pixels 33 and a set of fourth pixels 34 in a ratio of 1:1.

The structure of the pixels 30 in the first region 11s1 and the structure of the pixels 30 in the second region 11s2 may differ from the structures in the second embodiment as long as the color of the diffracted light emitted from the first region 11s1 toward the first fixed point OB1 differs from the color of the diffracted light emitted from the second region 11s2 toward the first fixed point OB1.

For example, the period d of all the pixels 30 that are in the first region 11s1 and emit diffracted light toward the first fixed point OB1 may be the first period, and the period d of all the pixels 30 that are in the second region 11s2 and emit diffracted light toward the first fixed point OB1 may be the second period that differs from the first period. This structure allows the color of the diffracted light emitted from the first region 11s1 toward the first fixed point OB1 to be different from the color of the diffracted light emitted from the second region 11s2 toward the first fixed point OB1.

Further, the periods d of the pixels 30 that are in the first region 11s1 and emit diffracted light toward the first fixed point OB1 may include three or more different values. In addition, the periods d of the pixels 30 that are in the second region 11s2 and emit diffracted light toward the first fixed point OB1 may include three or more different values. This structure still allows the color of the diffracted light emitted from the first region 11s1 toward the first fixed point OB1 to be different from the color of the diffracted light emitted from the second region 11s2 toward the first fixed point OB1.

The structure described above is also applicable to the structure that allows the color of the diffracted light emitted from the first region 11s1 toward the second fixed point OB2 to be different from the color of the diffracted light emitted from the second region 11s2 toward the second fixed point OB2.

As long as the color of the diffracted light emitted from the first region 11s1 differs from the color of the diffracted light emitted from the second region 11s2, diffracted light of the same color may be emitted from the first region 11s1 toward all fixed points, and diffracted light of the same color may be emitted from the second region 11s2 toward all fixed points.

For example, the first region 11s1 may consist of first pixels 31 and third pixels 33, and the second region 11s2 may consist of second pixels 32 and fourth pixels 34.

The color of the diffracted light emitted from the first region 11s1 toward the first fixed point OB1 may be the same as the color of the diffracted light emitted from the second region 11s2 toward the first fixed point OB1. This structure has an advantage equivalent to advantage (2) described above as long as the brightness of the diffracted light emitted from the first region 11s1 toward the first fixed point OB1 differs from the brightness of the diffracted light emitted from the second region 11s2 toward the first fixed point OB1.

For example, when the first region 11s1 includes first pixels 31 in place of second pixels 32, the color of the diffracted light emitted from the first region 11s1 toward the first fixed point OB1 will be the same as the color of the diffracted light emitted from the second region 11s2 toward the first fixed point OB1.

In this structure, the color of the diffracted light emitted from the first region 11s1 toward the second fixed point OB2 may be identical to or different from the color of the diffracted light emitted from the second region 11s2 toward the second fixed point OB2.

For example, in order for the diffracted light emitted from the first region 11s1 toward the second fixed point OB2 and the diffracted light emitted from the second region 11s2 toward the second fixed point OB2 to have same color, the second region 11s2 includes third pixels 33 in place of fourth pixels 34.

The first region 11s1 and the second region 11s2 may display images toward only one fixed point, and the image displayed by the first region 11s1 may differ from the image displayed by the second region 11s2 in color.

That is, the pixels 30 forming the uneven surface 11s include first period pixels, in which first protrusion surfaces and first depression surfaces are arranged at a first period in the arrangement direction, and second period pixels, in which second protrusion surfaces and second depression surfaces are arranged at a second period, which differs from the first period, in the arrangement direction. Of the first period pixels and second period pixels, the first region 11s1 includes at least the first period pixels, and the second region 11s2 includes at least the second period pixels. The ratio in the first region 11s1 between the sum of the areas of the first period pixels and the sum of the areas of the second period pixels differs from the ratio in the second region 11s2 between the sum of the areas of the first period pixels and the sum of the areas of the second period pixels.

The structures described above have the following advantage.

(8) The color of light emitted from the first region 11s1 toward a fixed point differs from the color of the light emitted from the second region 11s2 toward the fixed point. This allows for clear visual distinction between the image displayed by the first region 11s1 and the image displayed by the second region 11s2, as compared with a structure in which the two regions differ from each other only in brightness.

As long as the pixels 30 forming the uneven surface 11s include the first period pixels and the second period pixels, the uneven surface 11s does not have to be partitioned into the first region 11s1 and the second region 11s2.

Such a structure still has the following advantage.

(9) The display 10 is able to display an image formed by the diffracted light that is emitted from the first period pixels and the diffracted light that is emitted from the second period pixels and differs from the diffracted light emitted from the first period pixels in color.

The lightness of the image displayed by the first region 11s1 in the front-view direction of the display 10 may differ from the lightness of the image displayed by the second region 11s2 in the front-view direction of the display 10. Such a structure allows an image formed by the first region 11s1 and the second region 11s2 to be displayed in both of the front-view direction of the display 10 and the oblique view direction of the display 10.

For example, in the uneven surface 11s, when the height H in the first region 11s1 differs from the height H in the second region 11s2, the lightness of the image displayed by the first region 11s1 differs from the lightness of the image displayed by the second region 11s2.

The uneven structure 11 may include a light absorbing layer other than the metal layer 42, such as a black layer including plastic and black dye or pigment. The uneven structure 11 may include such a light absorbing layer as long as the light absorbing layer is located on the side of the light incident uneven surface that is opposite to the side on which light is incident. To facilitate reflection of diffracted light, the display 10 preferably includes the metal layer 42 as the light absorbing layer.

The light incident surface of the display 10 may include, in addition to the uneven surface 11s, a diffraction portion for diffracting light, a light scattering portion for scattering light, and a light collecting portion for collecting light.

The diffraction portion may be the diffraction grating DG that is described above referring to FIG. 3 and has a period d that is greater than or equal to the shortest wavelength of visible light.

The light scattering portion includes protrusion surfaces or depression surfaces, which are arranged irregularly and differ from one another in at least one of size, shape, and height in the Z direction. The light scattering portion diffusely reflects the light incident on the light scattering portion, such that the observer who views the display from the side from which light is incident on the light scattering portion perceives an image in a white or cloudy color.

In the light scattering portion, the protrusion surfaces may have a width of 3 µm or more in the X direction or the Y direction and a height of 1 µm or more in the Z direction, or the depression surfaces may have a width of 3 µm or more in the X direction or the Y direction and a depth of 1 µm or more in the Z direction. The width and the height of the protrusion surfaces or the width and the depth of the depression surfaces in the light scattering portion are greater than the width and the height of the diffraction grating of the diffraction portion and the width and the height of the uneven surface 11s described above. When features of the light scattering portion, such as the shape of the protrusion and depression surfaces and the direction in which the protrusion and depression surfaces are arranged, have regularity, the scattered light has directivity.

The light collecting portion may include a lens, such as a microlens or a Fresnel lens. Such a lens allows the light incident on the incident surface of the display 10 to appear to be collected on the side of the incident surface of the display 10 from which light is incident or collected on the rear side of the incident surface. This allows the display 10 to produce a visual effect specific to the lens.

The display 10 that has the diffraction portion, the light scattering portion, and the light collecting portion is more difficult to counterfeit.

The original plate for manufacturing the display 10 may be formed by a method other than the methods described above. For example, an original plate having an uneven surface may be manufactured by performing wet etching or dry etching on one surface of a base for forming an original plate, and the base may be made of silicon or metal, for example.

The article to which the display 10 is affixed is not limited to an IC card and may be other cards, such as a magnetic card, a wireless card, or an identification (ID) card. Alternatively, the article may be securities, such as gift certificates and stock certificates, or a tag to be attached to an article that should be authenticated, such as a luxury product like an art object. Further, the article may be a package enclosing an article that should be authenticated, or a part of the package.

When the base supporting the display 10 is made of paper, the display 10 may be embedded in the paper forming the base, and an opening may be formed in the section of the base that is aligned with the display 10 when one surface of the base is viewed in a direction facing the surface, so that the display 10 is exposed to the outside of the base. When the base is made of a light transmitting material, the display 10 may be embedded in the base, or may be fixed to the reverse surface of the base that is opposite to the display side including information other than the display 10.

The purpose of the display 10 is not limited to preventing counterfeiting. The display may be used to decorate an article. The display 10 may be used as items such as a toy and a learning material. In this case, the display 10 itself is the target of observation.

Third Embodiment

Referring to FIGS. 25 to 32, a third embodiment of a display according to the present disclosure is now described. The display of the third embodiment differs from the display of the second embodiment in the number of regions forming the uneven surface. Thus, the following descriptions will focus on this difference. The same reference numerals are given to those components that are the same as the corresponding components of the second embodiment. Such components will not be described in detail. As is the case with the second embodiment, the third embodiment is an example in which the pitch and the period of the uneven surface are the same value. In the following descriptions, the structure of the display and then the operation of the display are described.

[Structure of Display]

Figure 25:
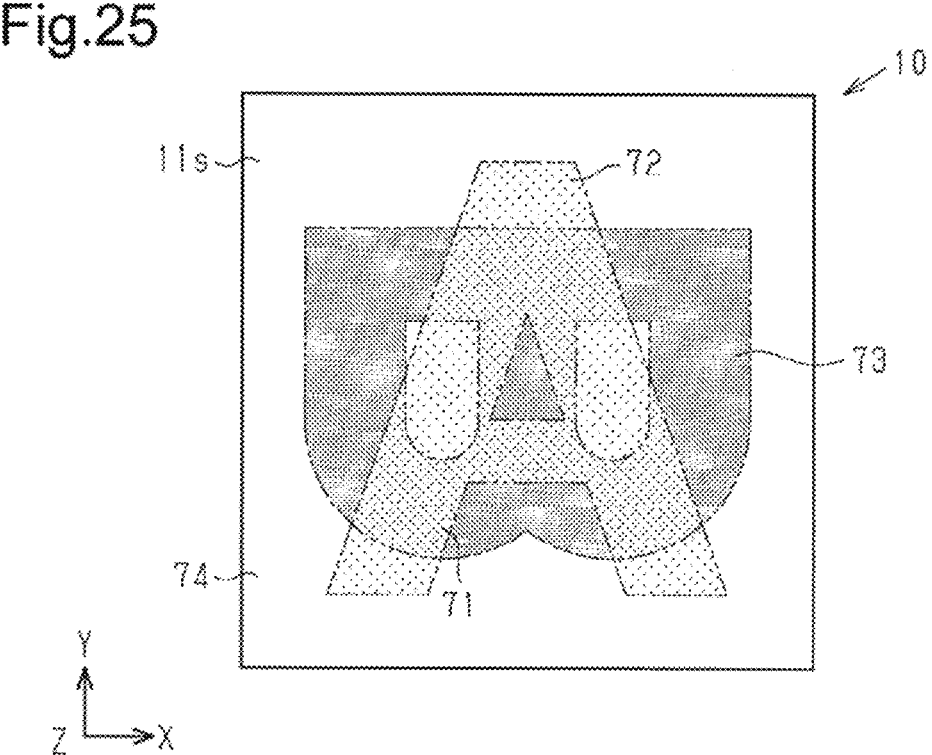
FIG. 25 is a plan view showing the planar structure of a display of a third embodiment.

Referring to FIGS. 25 to 29, the structure of the display is now described. In FIG. 25, some parts of the uneven surface are shaded with dots for clear distinction among the regions in the uneven surface.

As shown in FIG. 25, a display 10 includes an uneven surface 11s, which is a light incident surface. The uneven surface 11s includes a first region 71, a second region 72, a third region 73, and a fourth region 74.

In a plan view facing the uneven surface 11s, the first region 71 and the second region 72 are in contact with each other in the Y direction and represent the letter A. In other words, the first region 71 and the second region 72 are regions each representing part of the letter A.

The first region 71 and the third region 73 are in contact with each other in the X direction in a plan view facing the uneven surface 11s and represent the letter B. In other words, the first region 71 and the third region 73 are regions each representing part of the letter B.

The fourth region 74 is the region of the uneven surface 11s that surrounds the first region 71, the second region 72, and the third region 73 and forms the outer edge of the uneven surface 11s.

Figure 26:
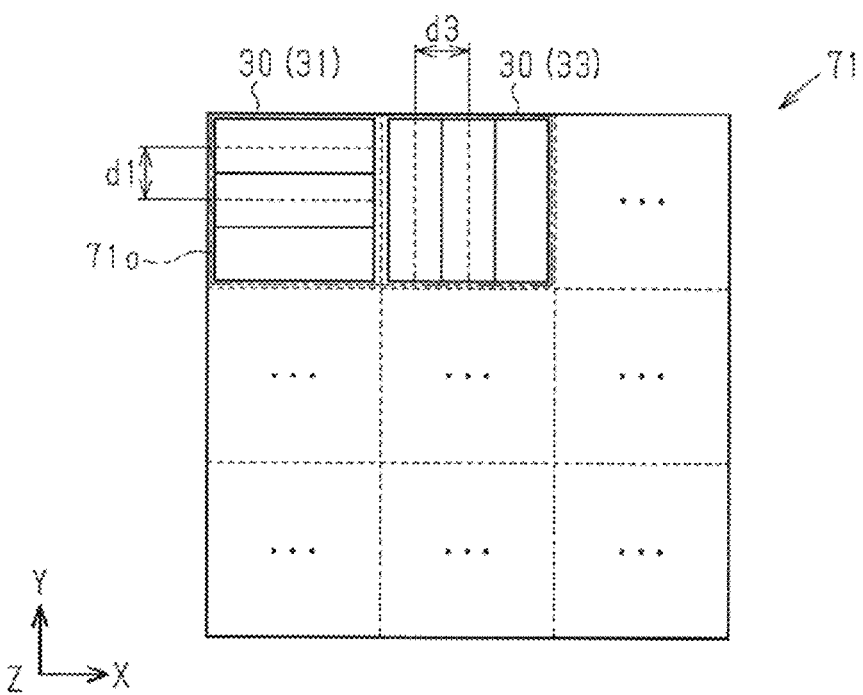
FIG. 26 is an enlarged plan view showing a part of the planar structure of a first region in an uneven surface.

As shown in FIG. 26, the first region 71 consists of a plurality of first pixels 31 and a plurality of third pixels 33. Each first pixel 31 is located side by side with a third pixel 33 in the X direction, and these two pixels 30 form one set of first pixel group 71g. The first region 71 includes a plurality of first pixel groups 71g arranged in the X direction and the Y direction. The first period d1 of the first pixels 31 and the third period d3 of the third pixels 33 are the same value and may be 400 nm, for example.

Figure 27:
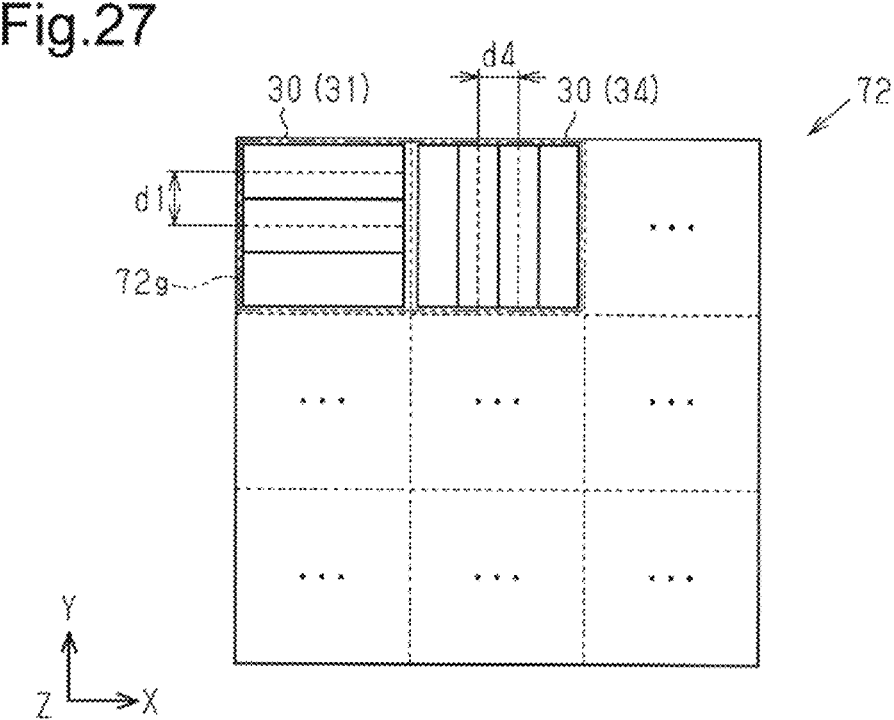
FIG. 27 is an enlarged plan view showing a part of the planar structure of a second region in the uneven surface.

As shown in FIG. 27, the second region 72 consists of a plurality of first pixels 31 and a plurality of fourth pixels 34. Each first pixel 31 is located side by side with a fourth pixel 34 in the X direction, and these two pixels 30 form one set of second pixel group 72g. The second region 72 includes a plurality of second pixel groups 72g arranged in the X direction and the Y direction. The fourth period d4 of the fourth pixels 34 is 300 nm, for example.

Figure 28:
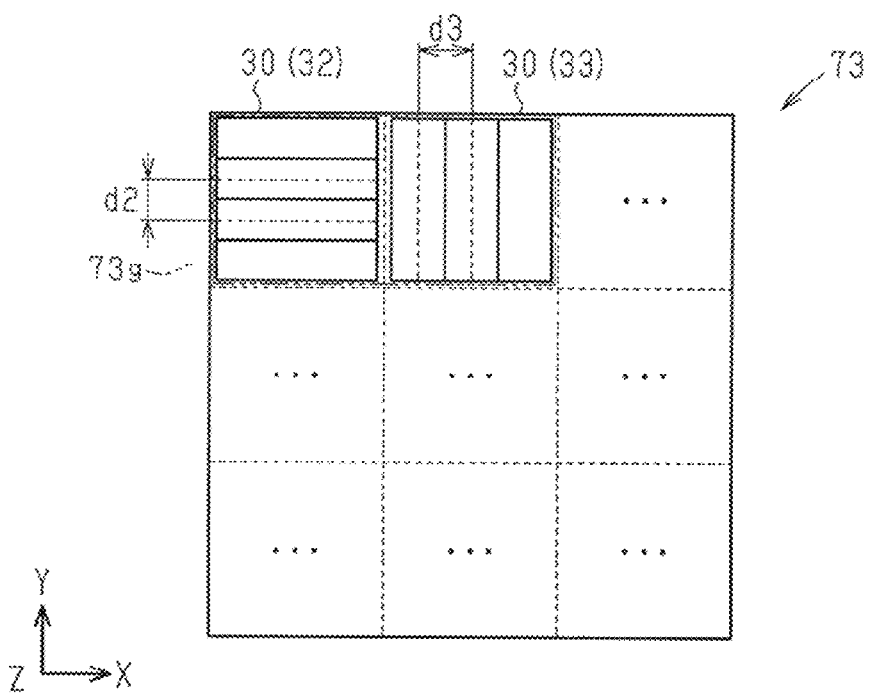
FIG. 28 is an enlarged plan view showing a part of the planar structure of a third region in the uneven surface.

As shown in FIG. 28, the third region 73 consists of a plurality of second pixels 32 and a plurality of third pixels 33. Each second pixel 32 is located side by side with a third pixel 33 in the X direction, and these two pixels 30 form one set of third pixel group 73g. The third region 73 includes a plurality of third pixel groups 73g arranged in the X direction and the Y direction. The second period d2 of the second pixels 32 and the fourth period d4 of the fourth pixels 34 are the same value and may be 300 nm, for example.

Figure 29:
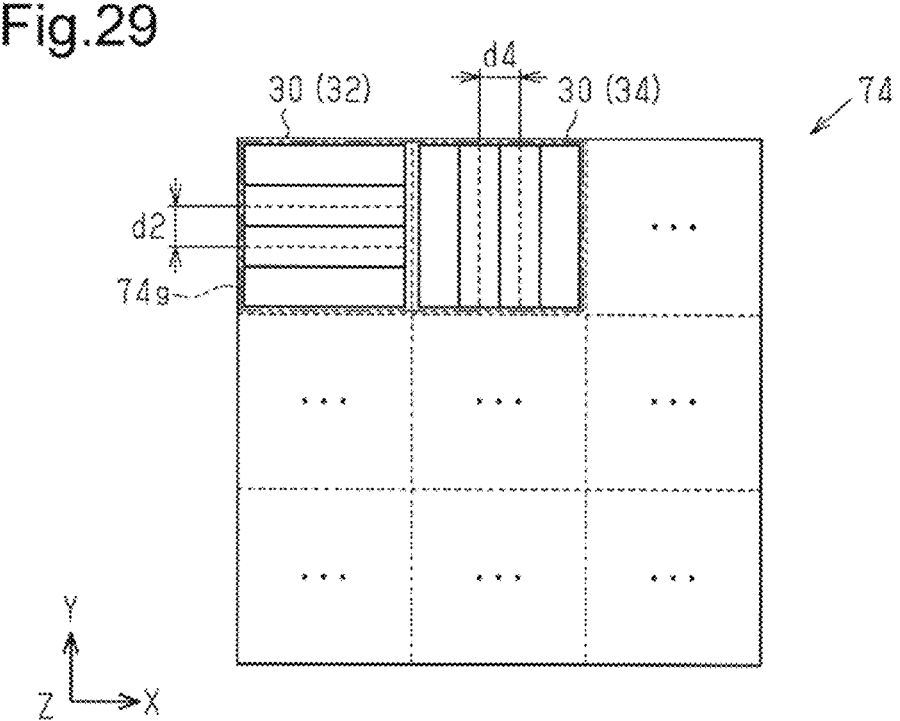
FIG. 29 is an enlarged plan view showing a part of the planar structure of a fourth region in the uneven surface.

As shown in FIG. 29, the fourth region 74 consists of a plurality of second pixels 32 and a plurality of fourth pixels 34. Each second pixel 32 is located side by side with a fourth pixel 34 in the X direction, and these two pixels 30 form one set of fourth pixel group 74g. The fourth region 74 includes a plurality of fourth pixel groups 74g arranged in the X direction and the Y direction.

The first region 71 and the second region 72, each representing part of the letter A, include first pixels 31 as common pixels 30. The first region 71 and the third region 73, each representing part of the letter B, include third pixels 33 as common pixels 30. The fourth region 74, which does not represent either of the letter A or the letter B, does not include first pixels 31 or third pixels 33 but includes other pixels 30, namely, second pixels 32 and fourth pixels 34.

[Operation of Display]

Figure 30:
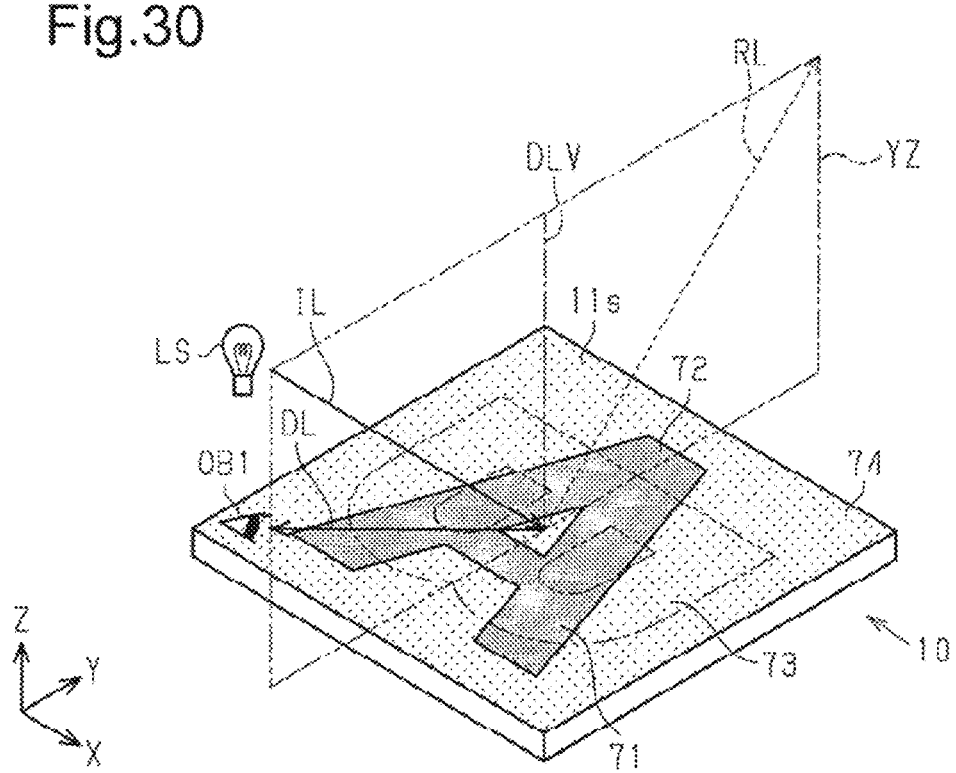
FIG. 30 is a diagram for illustrating the operation of the display when viewed obliquely.
Figure 31:
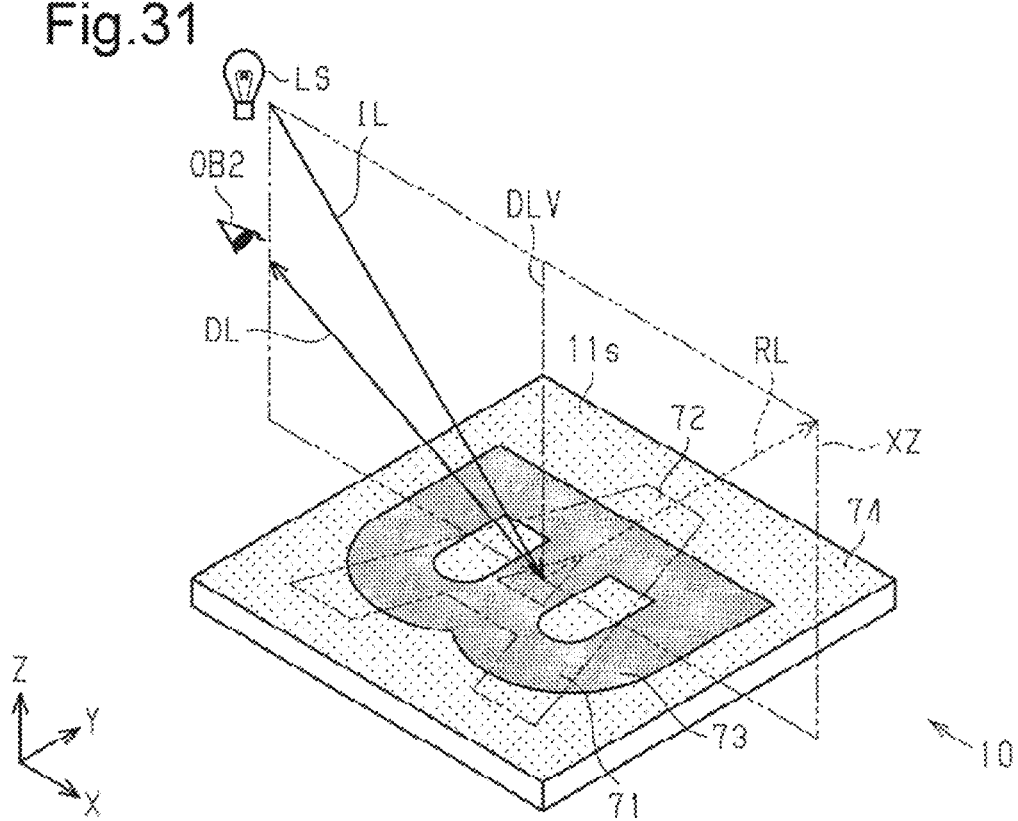
FIG. 31 is a diagram for illustrating the operation of the display when viewed obliquely.
Figure 32:
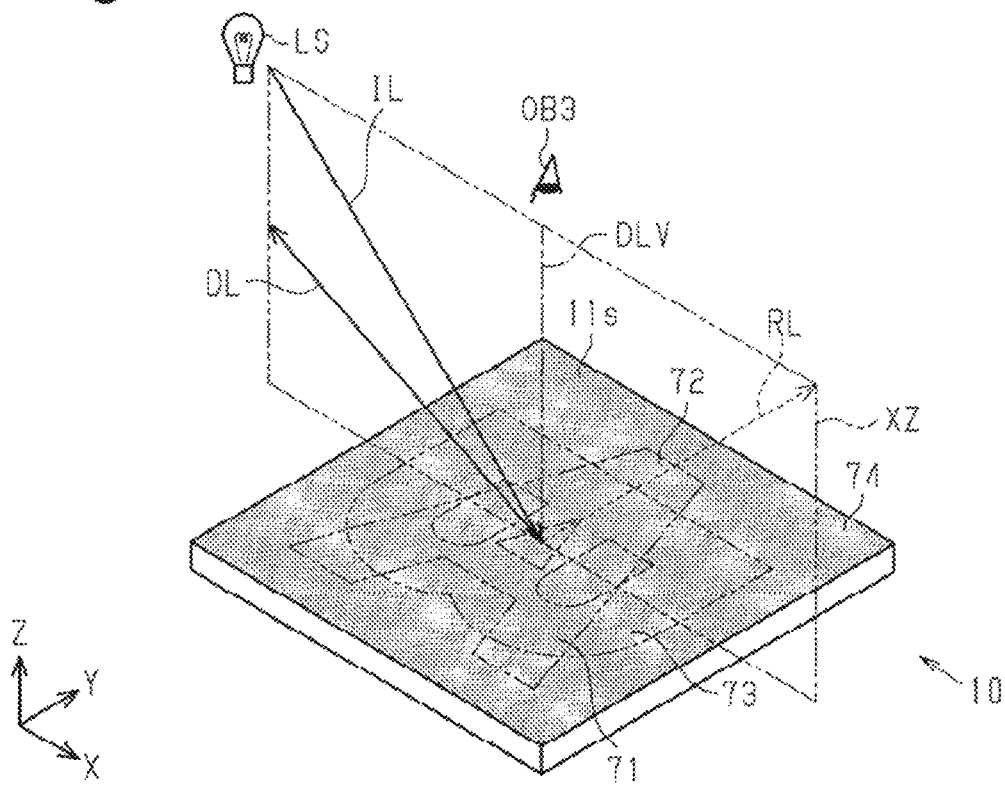
FIG. 32 is a diagram for illustrating the operation of the display when viewed from the front.

Referring to FIGS. 30 to 32, the operation of the display 10 is now described.

As shown in FIG. 30, a light source LS may emit illumination light IL from a predetermined area in the YZ plane YZ toward the display 10 in an oblique direction, and an observer may view the display 10 from a first fixed point OB1, which is a point in the YZ plane YZ on the side opposite to the emission light RL with respect to the front-view direction DLV of the display 10. Here, only the pixels 30 that include protrusion surfaces and depression surfaces extending in the X direction, namely, the first pixels 31 and the second pixels 32, emit diffracted light DL toward the first fixed point OB1.

Since the first period d1 of the first pixels 31 differs from the second period d2 of the second pixels 32, the color of the diffracted light DL emitted from the first pixels 31 toward the first fixed point OB1 differs from the color of the diffracted light DL emitted from the second pixels 32 toward the first fixed point OB1.

Thus, when the display 10 is viewed from the first fixed point OB1, the first region 71 and the second region 72 emit diffracted light DL of the same color toward the first fixed point OB1. On the other hand, the third region 73 and the fourth region 74 emit diffracted light DL of the same color toward the first fixed point OB1, but this color is different from the color of the diffracted light DL emitted by the first region 71 and the second region 72. As such, the display 10 displays toward the first fixed point OB1 an image that is formed by the image representing the letter A and the image representing the background of the letter A.

For example, in the YZ plane YZ, the angle formed by the front-view direction DLV and the illumination direction of the illumination light IL is −40°, and the angle formed by the front-view direction DLV and the direction of view of the observer at the first fixed point OB1 is −60°. Thus, as defined by Expression (2), the first region 71 and the second region 72 emit orange diffracted light DL toward the first fixed point OB1, while the third region 73 and the fourth region 74 emit blue diffracted light DL toward the first fixed point OB1.

As shown in FIG. 31, a light source LS may emit illumination light IL from a predetermined area in the XZ plane XZ toward the display 10 in an oblique direction, and the observer may view the display 10 from a second fixed point OB2, which is a point in the XZ plane XZ on the side opposite to the emission light RL with respect to the front-view direction DLV of the display 10. Here, only the pixels 30 that include the protrusion surfaces and the depression surfaces extending in the Y direction, namely, the third pixels 33 and the fourth pixels 34, emit diffracted light DL toward the second fixed point OB2.

Since the third period d3 of the third pixels 33 differs from the fourth period d4 of the fourth pixels 34, the color of the diffracted light DL emitted from the third pixels 33 toward the second fixed point OB2 differs from the color of the diffracted light DL emitted from the fourth pixels 34 toward the second fixed point OB2.

Thus, when the display 10 is viewed from the second fixed point OB2, the first region 71 and the third region 73 emit diffracted light DL of the same color toward the second fixed point OB2. On the other hand, the second region 72 and the fourth region 74 emit diffracted light DL of the same color toward the second fixed point OB2, but this color is different from the color of the diffracted light DL emitted by the first region 71 and the third region 73. As such, the display 10 displays toward the second fixed point OB2 an image that is formed by the image representing the letter B and the image representing the background of the letter B.

For example, in the XZ plane XZ, the angle formed by the front-view direction DLV and the illumination direction of the illumination light IL is −40°, and the angle formed by the front-view direction DLV and the direction of view of the observer at the second fixed point OB2 is −60°. Thus, as defined by Expression (2), the first region 71 and the third region 73 emit orange diffracted light DL toward the second fixed point OB2, while the second region 72 and the fourth region 74 emit blue diffracted light DL toward the second fixed point OB2.

As shown in FIG. 32, the display 10 further displays an image having a reduced lightness, such as an image in black, toward a third fixed point OB3 located in the front-view direction DLV. The images displayed by the first region 71, the second region 72, the third region 73, and the fourth region 74 in the front-view direction DLV substantially have the same lightness.

Accordingly, when the display 10 is viewed from the third fixed point OB3, the images displayed by the display 10 are perceived as a single image. Thus, when the display 10 is viewed in the front-view direction DLV, the image formed by the display 10 with the first region 71 and the second region 72 and the image formed by the display 10 with the first region 71 and the third region 73 are hidden from the observer.

The third embodiment of the display described above has the following advantage in addition to advantages (1), (4), and (5).

(10) The image displayed by the display 10 toward the first fixed point OB1 differs from the image displayed toward the second fixed point OB2. Thus, as compared with a structure in which the image displayed toward the first fixed point OB1 is identical, except for the color and brightness, to the image displayed toward the second fixed point OB2, the visual effect produced by the display 10 for the observer is enhanced, and the display 10 is more difficult to counterfeit.

[Modifications of Third Embodiment]

The above-described third embodiment may be modified as follows.

The uneven surface 11s may include at least the first region, the second region, and the third region. Such a structure has the following advantage as long as the first region consists of the first pixels 31 and the third pixels 33, the second region consists of the first pixels 31 and the fourth pixels 34, and the third region consists of the second pixels 32 and the third pixels 33.

That is, the first region and the second region display images of the same color toward the first fixed point OB1, and the first region and the third region display images of the same color toward the second fixed point OB2. As such, different regions of the display 10 display images of the same color toward the first fixed point OB1 and the second fixed point OB2.

In each of the first to fourth regions 71 to 74, two types of pixels 30 forming the region may alternate in the X direction and the Y direction.

The first to fourth regions 71 to 74 may each include, as the pixels that emit diffracted light DL toward the first fixed point OB1, two or more types of pixels that differ from one another in the period of repetition unit. The first to fourth regions 71 to 74 may each include, as the pixels that emit diffracted light DL toward the second fixed point OB2, two or more types of pixels that differ from one another in the period of repetition unit. Such a structure allows a single region to emit light having a mixed color of different colors toward both the first fixed point OB1 and the second fixed point OB2.

A technical idea obtainable from the above illustrated embodiments and the modifications will now be described below as a means for solving the problems.

[1] A display comprising:
an uneven structure including
a light transmitting uneven structure layer including a transmission side uneven surface, and
a metal layer that covers the transmission side uneven surface and includes an uneven surface, which serves as an incident surface on which light is incident and which is one of a surface that is in contact with the transmission side uneven surface and a surface that is opposite to the surface that is in contact with the transmission side uneven surface, wherein
the uneven surface includes a section in which protrusion surfaces and depression surfaces alternate in an arrangement direction,
each protrusion surface has a shape of a strip extending in an extension direction perpendicular to the arrangement direction,
each protrusion surface tapers toward a top section in a thickness direction of the uneven structure,
each depression surface has a shape of a strip extending in the extension direction,
each depression surface tapers toward a bottom section in the thickness direction of the uneven structure, and
the protrusion surfaces and the depression surfaces are arranged at a period that limits reflection of light, which is incident on the uneven surface, in a front-view direction of the uneven surface and diffracts the light incident on the uneven surface to emit diffracted light in an oblique view direction of the uneven surface.

The invention claimed is:

1. A display comprising an uneven structure having an uneven surface, which serves as an incident surface, on which light is incident, wherein
the uneven surface includes a section in which protrusion surfaces and depression surfaces alternate in an arrangement direction,
each protrusion surface has a shape of a strip extending in an extension direction perpendicular to the arrangement direction,
each protrusion surface tapers toward a top section in a thickness direction of the uneven structure,
each depression surface has a shape of a strip extending in the extension direction,
each depression surface tapers toward a bottom section in the thickness direction of the uneven structure,
the protrusion surfaces and the depression surfaces are arranged at a period that limits reflection of light that is incident on the uneven surface in a front-view direction of the uneven surface and diffracts the light incident on the uneven surface to emit diffracted light in an oblique view direction of the uneven surface,
the uneven surface has a height that is greater than or equal to half the period,
a tangent of the top section forms an inclination angle $\theta$ with a tangent of a section other than the top section,
the inclination angle $\theta$ is between 50° and 80° inclusive,
a gradient S of a surface connecting the top section and the bottom section in the uneven surface is defined by $$S=|\log_{10}(Wb/Wt)|^{-1},$$

the gradient S is less than 25,
for a structure that is formed by each protrusion surface and two of the depression surfaces adjacent to the protrusion surface and has a height in the thickness direction, the Wb is a width of the structure in the arrangement direction at one tenth of the height from the bottom section, and the Wt is a width of the structure in the arrangement direction at nine tenth of the height from the bottom section,
the uneven structure has a property of absorbing light incident on the uneven surface,
a side from which light is incident on the uneven surface is an observation side,
a point at a predetermined position on the observation side is a first fixed point,
a point at a position different from the first fixed point on the observation side is a second fixed point,
the arrangement direction is a first arrangement direction,
the extension direction is a first extension direction,
the protrusion surfaces are first protrusion surfaces,
the depression surfaces are first depression surfaces,
a direction intersecting the first arrangement direction is a second arrangement direction,
the uneven surface is partitioned into a plurality of pixels that are arranged in a lattice,
the plurality of pixels include
first arrangement pixels, which include the first protrusion surfaces and the first depression surfaces alternating in the first arrangement direction and emit diffracted light toward the first fixed point, and
second arrangement pixels, which include second protrusion surfaces and second depression surfaces alternating in the second arrangement direction and emit diffracted light toward the second fixed point, each second protrusion surface has a shape of a strip extending in a second extension direction perpendicular to the second arrangement direction,
each second protrusion surface tapers toward a top section in the thickness direction of the uneven structure,
each second depression surface has a shape of a strip extending in the second extension direction perpendicular to the second arrangement direction,
each second depression surface tapers toward a bottom section in the thickness direction of the uneven structure,
the second protrusion surfaces and the second depression surfaces are arranged at a period that limits reflection of light that is incident on the second arrangement pixels in a front-view direction of the second arrangement pixels and diffracts the light incident on the second arrangement pixels to emit diffracted light in an oblique view direction of the second arrangement pixels,
the uneven surface includes a first region and a second region,
the first region includes a plurality of first pixel groups, the second region includes a plurality of second pixel groups, and each second pixel group has the same number of pixels that each first pixel group has,
each first pixel group includes one or more of the plurality of pixels at least including one of the first arrangement pixels, and each second pixel group includes one or more of the plurality of pixels at least including one of the second arrangement pixels,
a ratio of a sum of areas of the first arrangement pixels to an area of each first pixel group differs from a ratio of a sum of areas of the first arrangement pixels to an area of each second pixel group,
a ratio of a sum of areas of the second arrangement pixels to the area of each first pixel group differs from a ratio of a sum of areas of the second arrangement pixels to the area of each second pixel group, and
when white light is emitted to the display in a front-view direction of the display, the reflectance of all wavelengths of light from 400 nm to 700 nm is less than or equal to 10%.

2. The display according to claim 1, wherein the uneven surface is configured such that a lightness of an image displayed by the first region in the front-view direction and a lightness of an image displayed by the second region in the front-view direction are substantially equal to each other in the front-view direction.

3. The display according to claim 1, wherein the height of the uneven surface is greater than the period.

4. The display according to claim 1, wherein the period is between 200 nm and 400 nm inclusive, and the height of the uneven surface is between 200 nm and 750 nm inclusive.

5. The display according to claim 1, wherein each pixel is square, and the length of one side of each pixel is between 3 μm and 300 μm inclusive.

6. A display comprising an uneven structure having an uneven surface, which serves as an incident surface, on which light is incident, wherein
the uneven surface includes a section in which protrusion surfaces and depression surfaces alternate in an arrangement direction,
each protrusion surface has a shape of a strip extending in an extension direction perpendicular to the arrangement direction,
each protrusion surface tapers toward a top section in a thickness direction of the uneven structure,
each depression surface has a shape of a strip extending in the extension direction,
each depression surface tapers toward a bottom section in the thickness direction of the uneven structure,
the protrusion surfaces and the depression surfaces are arranged at a period that limits reflection of light that is incident on the uneven surface in a front-view direction of the uneven surface and diffracts the light incident on the uneven surface to emit diffracted light in an oblique view direction of the uneven surface,
the uneven surface has a height that is greater than or equal to half the period,
a tangent of the top section forms an inclination angle θ with a tangent of a section other than the top section,
the inclination angle θ is between 50° and 80° inclusive,
a gradient S of a surface connecting the top section and the bottom section in the uneven surface is defined by $S=|\log_{10}(Wb/Wt)|^{-1}$, the gradient S is less than 25,
for a structure that is formed by each protrusion surface and two of the depression surfaces adjacent to the protrusion surface and has a height in the thickness direction, the Wb is a width of the structure in the arrangement direction at one tenth of the height from the bottom section, and the Wt is a width of the structure in the arrangement direction at nine tenth of the height from the bottom section,
the uneven structure has a property of absorbing light incident on the uneven surface,
the period is a first period,
the extension direction is a first extension direction,
the protrusion surfaces are first protrusion surfaces,
the depression surfaces are first depression surfaces,
the uneven surface is partitioned into a plurality of pixels that are arranged in a lattice,
the plurality of pixels include
first period pixels, which include the first protrusion surfaces and the first depression surfaces that are arranged at the first period in the arrangement direction, and
second period pixels, which include second protrusion surfaces and second depression surfaces that are arranged at a second period, which differs from the first period, in the arrangement direction,
each second protrusion surface has a shape of a strip extending in a second extension direction,
each second protrusion surface tapers toward a top section in the thickness direction of the uneven structure,
each second depression surface has a shape of a strip extending in the extension direction,
each second depression surface tapers toward a bottom section in the thickness direction of the uneven structure,
the second extension direction is a same direction as the first direction, and
the second protrusion surfaces and the second depression surfaces are arranged at the second period, which limits reflection of light that is incident on the second period pixels in a front-view direction of the second period pixels and diffracts the light incident on the second period pixels to emit diffracted light in an oblique view direction of the second period pixels,
the uneven surface includes a first region and a second region,
the first region includes a plurality of first pixel groups,
the second region includes a plurality of second pixel groups, and each second pixel group has the same number of pixels that each first pixel group has, each first pixel group includes one or more of the plurality of pixels at least including one of the first period pixels, and each second pixel group includes one or more of the plurality of pixels at least including one of the second period pixels, a ratio between a sum of areas of the first period pixels in each first pixel group and a sum of areas of the second period pixels in each first pixel group differs from a ratio between a sum of areas of the first period pixels in each second pixel group and a sum of areas of the second period pixels in each second pixel group, and when white light is emitted to the display in a front-view direction of the display, the reflectance of all wavelengths of light from 400 nm to 700 nm is less than or equal to 10%.

7. The display according to claim 6, wherein the uneven surface is configured such that a lightness of an image displayed by the first region in the front-view direction and a lightness of an image displayed by the second region in the front-view direction are substantially equal to each other in the front-view direction.

8. The display according to claim 6, wherein the height of the uneven surface is greater than the period.

9. The display according to claim 6, wherein the period is between 200 nm and 400 nm inclusive, and the height of the uneven surface is between 200 nm and 750 nm inclusive.

10. The display according to claim 6, wherein each pixel is square, and the length of one side of each pixel is between 3 μm and 300 μm inclusive.

11. A display comprising an uneven structure having an uneven surface, which serves as an incident surface, on which light is incident, wherein the uneven surface includes a section in which protrusion surfaces and depression surfaces alternate in an arrangement direction, each protrusion surface has a shape of a strip extending in an extension direction perpendicular to the arrangement direction, each protrusion surface tapers toward a top section in a thickness direction of the uneven structure, each depression surface has a shape of a strip extending in the extension direction, each depression surface tapers toward a bottom section in the thickness direction of the uneven structure, the protrusion surfaces and the depression surfaces are arranged at a period that limits reflection of light that is incident on the uneven surface in a front-view direction of the uneven surface and diffracts the light incident on the uneven surface to emit diffracted light in an oblique view direction of the uneven surface, the uneven surface has a height that is greater than or equal to half the period, the uneven structure has a property of absorbing light incident on the uneven surface, a side from which light is incident on the uneven surface is an observation side, a point at a predetermined position on the observation side is a first fixed point, a point at a position different from the first fixed point on the observation side is a second fixed point, the arrangement direction is a first arrangement direction, the extension direction is a first extension direction, the protrusion surfaces are first protrusion surfaces, the depression surfaces are first depression surfaces, a direction intersecting the first arrangement direction is a second arrangement direction, the uneven surface is partitioned into a plurality of pixels that are arranged in a lattice, the plurality of pixels include first arrangement pixels, which include the first protrusion surfaces and the first depression surfaces alternating in the first arrangement direction and emit diffracted light toward the first fixed point, and second arrangement pixels, which include second protrusion surfaces and second depression surfaces alternating in the second arrangement direction and emit diffracted light toward the second fixed point, each second protrusion surface has a shape of a strip extending in a second extension direction perpendicular to the second arrangement direction, each second protrusion surface tapers toward a top section in the thickness direction of the uneven structure, each second depression surface has a shape of a strip extending in the second extension direction perpendicular to the second arrangement direction, each second depression surface tapers toward a bottom section in the thickness direction of the uneven structure, the second protrusion surfaces and the second depression surfaces are arranged at a period that limits reflection of light that is incident on the second arrangement pixels in a front-view direction of the second arrangement pixels and diffracts the light incident on the second arrangement pixels to emit diffracted light in an oblique view direction of the second arrangement pixels, the uneven surface includes a first region and a second region, the first region includes a plurality of first pixel groups, the second region includes a plurality of second pixel groups, and each second pixel group has the same number of pixels that each first pixel group has, each first pixel group includes one or more of the plurality of pixels at least including one of the first arrangement pixels and one of the second arrangement pixels, and each second pixel group includes one or more of the plurality of pixels at least including one of the first arrangement pixels and one of the second arrangement pixels, the period of the first protrusion surfaces and the first depression surfaces included in the first arrangement pixel in each first pixel group is different from the period in each second pixel group, the period of the second protrusion surfaces and the second depression surfaces included in the second arrangement pixel in each first pixel group is different from the period in each second pixel group, a ratio of a sum of areas of the first arrangement pixels to an area of each first pixel group differs from a ratio of a sum of areas of the first arrangement pixels to an area of each second pixel group, and a ratio of a sum of areas of the second arrangement pixels to the area of each first pixel group differs from a ratio of a sum of areas of the second arrangement pixels to the area of each second pixel group.

* * * * *